United States Patent
Maaruf et al.

(10) Patent No.: US 12,466,389 B1
(45) Date of Patent: Nov. 11, 2025

(54) SYSTEM AND METHOD FOR CONTROLLING FUEL CELL HYBRID ELECTRIC VEHICLE WITH SENSOR FAULT TOLERANCE

(71) Applicant: King Fahd University of Petroleum and Minerals, Dhahran (SA)

(72) Inventors: Muhammad Maaruf, Dhahran (SA); Sami Elferik, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/253,351

(22) Filed: Jun. 27, 2025

(51) Int. Cl.
*B60W 20/50* (2016.01)
*B60W 10/26* (2006.01)
*B60W 10/28* (2006.01)
*B60W 50/02* (2012.01)

(52) U.S. Cl.
CPC ........... *B60W 20/50* (2013.01); *B60W 10/26* (2013.01); *B60W 10/28* (2013.01); *B60W 50/0205* (2013.01); *B60W 2050/0215* (2013.01)

(58) Field of Classification Search
CPC ...... B60W 20/50; B60W 10/26; B60W 10/28; B60W 50/0205; B60W 2050/0215
USPC .......................................................... 701/22
See application file for complete search history.

(56) References Cited

U.S. PATENT DOCUMENTS

| | | | |
|---|---|---|---|
| 8,933,572 B1 * | 1/2015 | Abdur-Rahim | F03D 7/00 290/55 |
| 2023/0118756 A1 * | 4/2023 | Hoffmann | B60T 8/174 |
| 2023/0375636 A1 * | 11/2023 | Niu | G06N 3/047 |
| 2024/0347818 A1 | 10/2024 | Khalid et al. | |
| 2025/0202262 A1 * | 6/2025 | Deutsch | H02J 7/345 |

FOREIGN PATENT DOCUMENTS

CN 117032209 A 11/2023

OTHER PUBLICATIONS

Muhammad Khalid, "Passivity-Based Nonlinear Control Approach for Efficient Energy Management in Fuel Cell Hybrid Electric Vehicles", SSRN, Posted Jan. 24, 2024, Electronic copy available at: https://ssrn.com/abstract=4684336, 50 pages.
Shahid Hassan Mian, et al., "Optimized nonlinear controller for fuel cell, supercapacitor, battery, hybrid photoelectrochemical and photovoltaic cells based hybrid electric vehicles", Energy, vol. 283, Nov. 15, 2023, 129121, 11 Pages.

* cited by examiner

*Primary Examiner* — B M M Hannan
(74) *Attorney, Agent, or Firm* — Oblon, McClelland, Maier & Neustadt, L.L.P.

(57) ABSTRACT

A method for controlling a fuel cell hybrid electric vehicle (FCHEV) with sensor fault tolerance includes receiving current measurements of a fuel cell, a battery, an ultracapacitor, and a voltage measurement of a DC-bus from sensors; detecting and estimating a sensor fault in at least one of the current measurements using a radial basis function neural network (RBFNN); calculating a new value for a single parameter of the RBFNN according to a minimum learning parameter scheme; calculating a duty cycle value for each power converter; and applying the calculated duty cycle value to power converters that connect the fuel cell, the battery, and the ultracapacitor to the DC-bus, to maintain a current distribution despite the sensor fault.

16 Claims, 24 Drawing Sheets

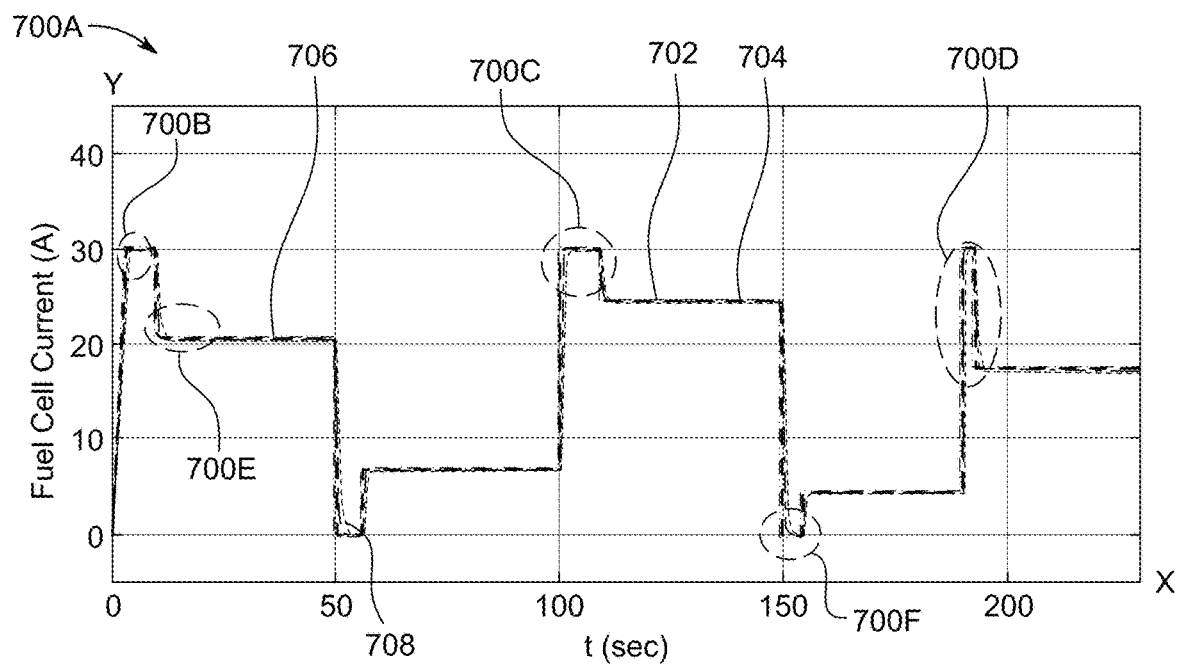
FIG. 7A
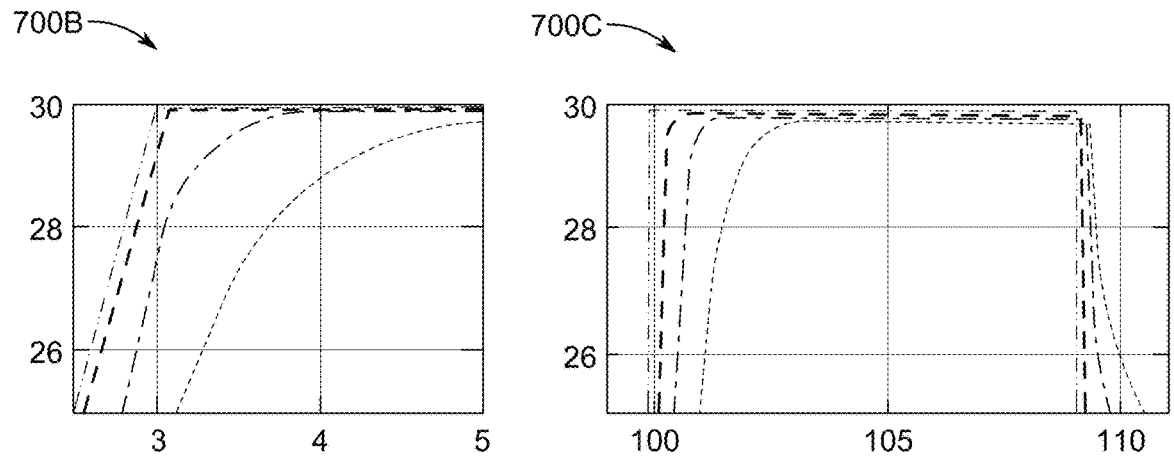
FIG. 7B
FIG. 7C

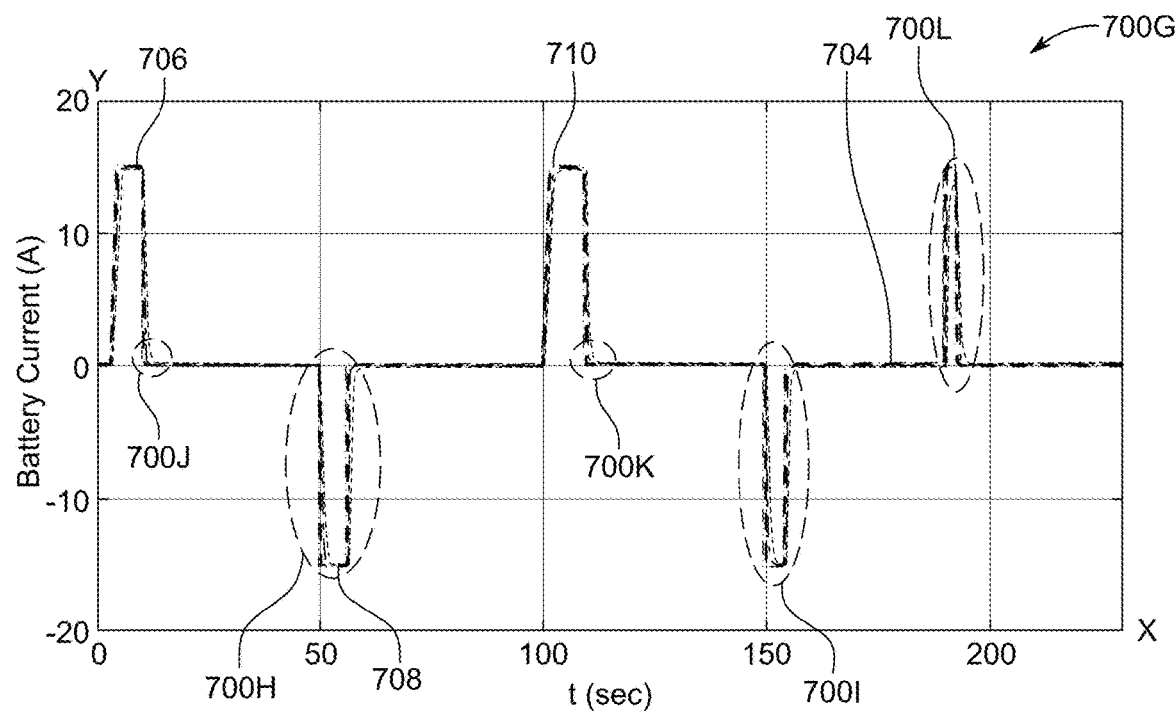
FIG. 7G
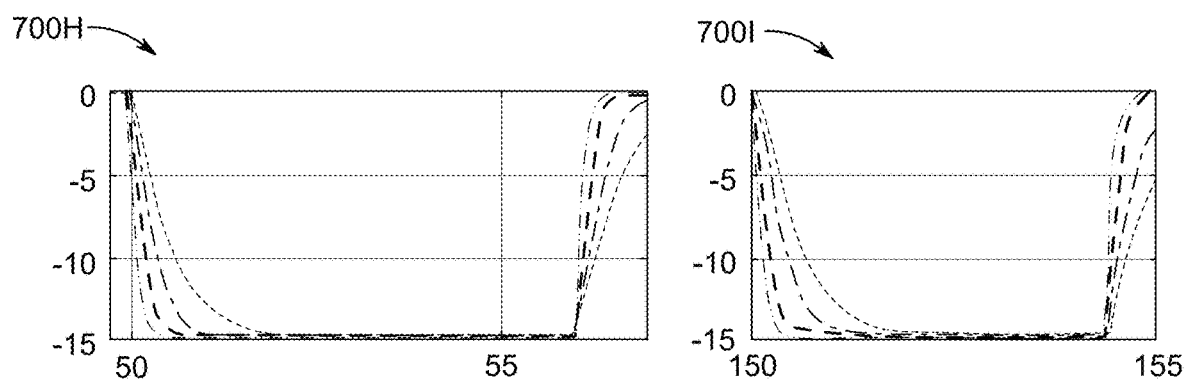
FIG. 7H
FIG. 7I

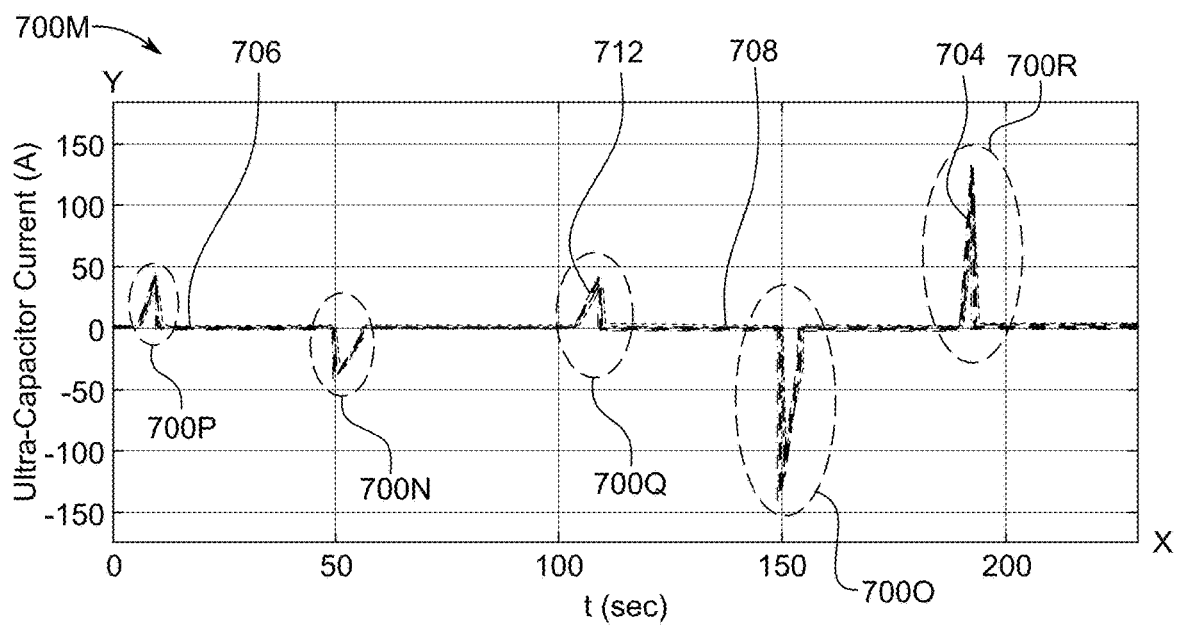
FIG. 7M
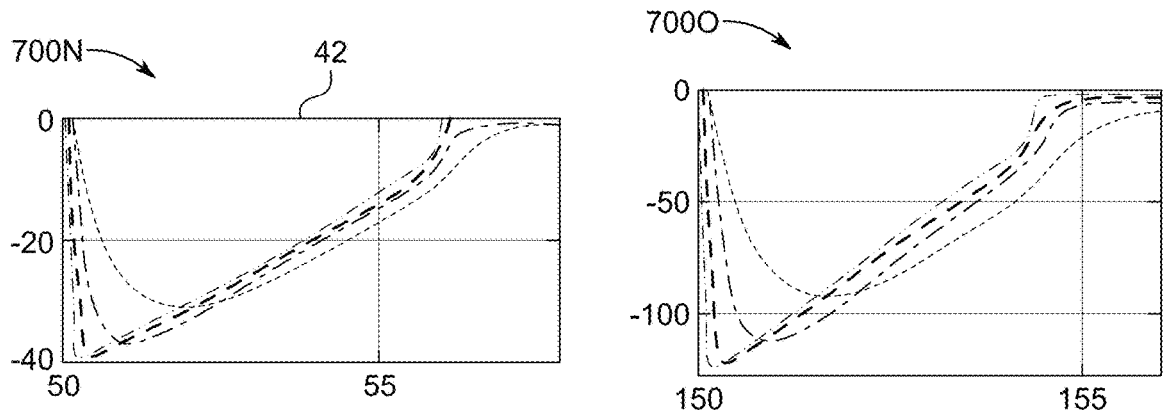
FIG. 7N
FIG. 7O

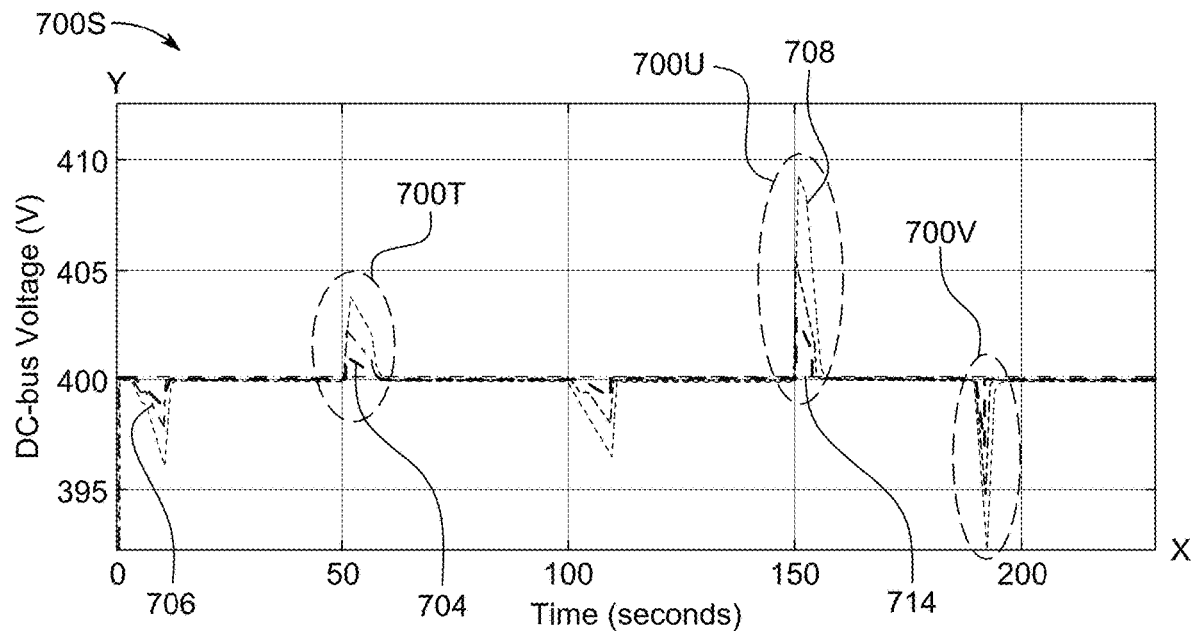
FIG. 7S
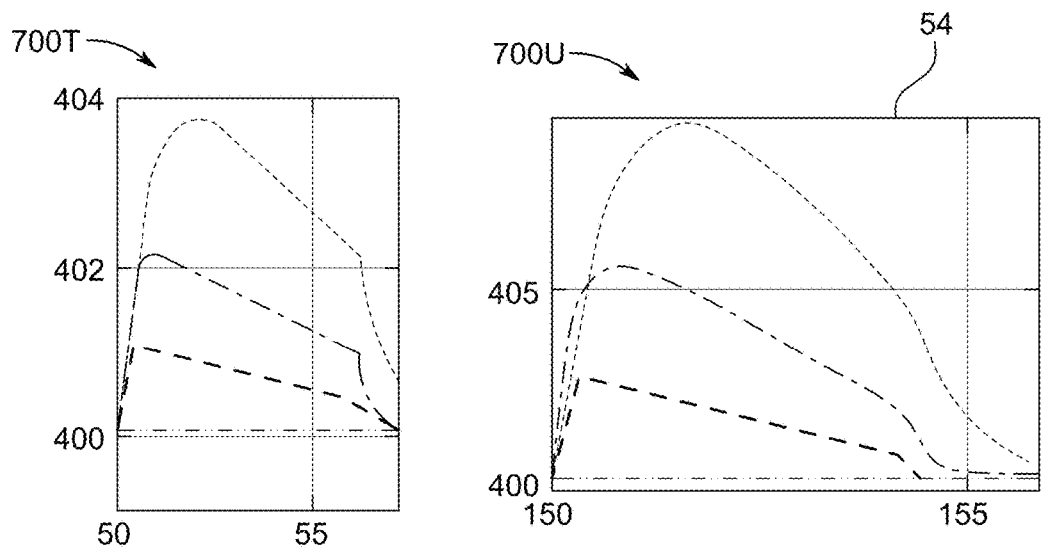
FIG. 7T
FIG. 7U

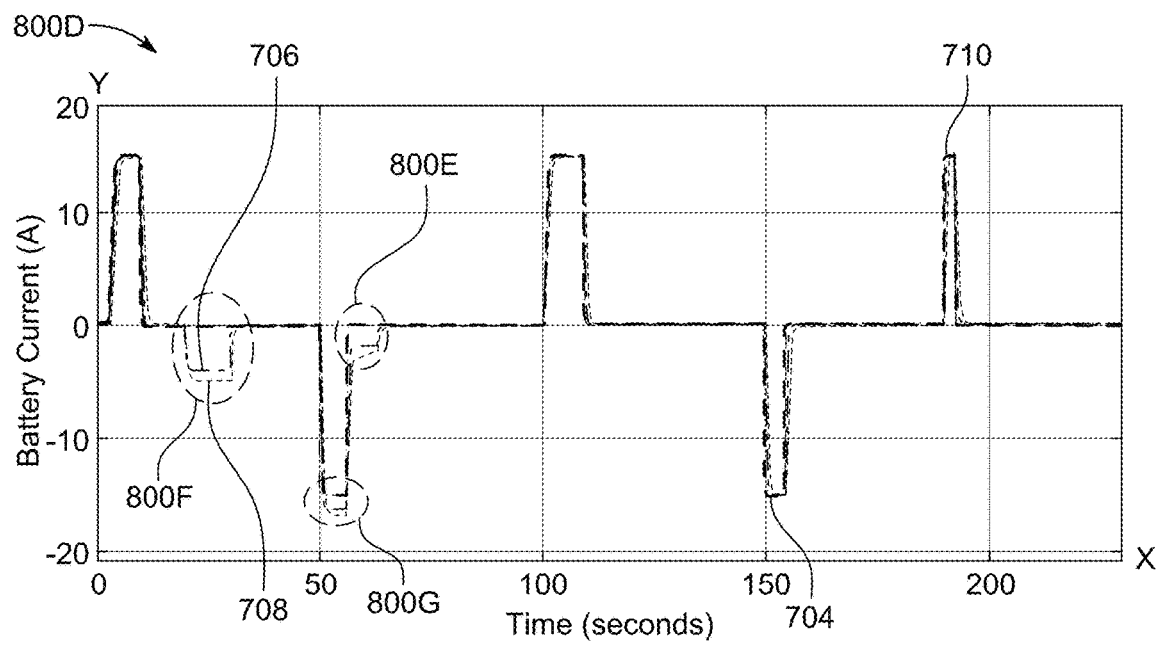
FIG. 8D
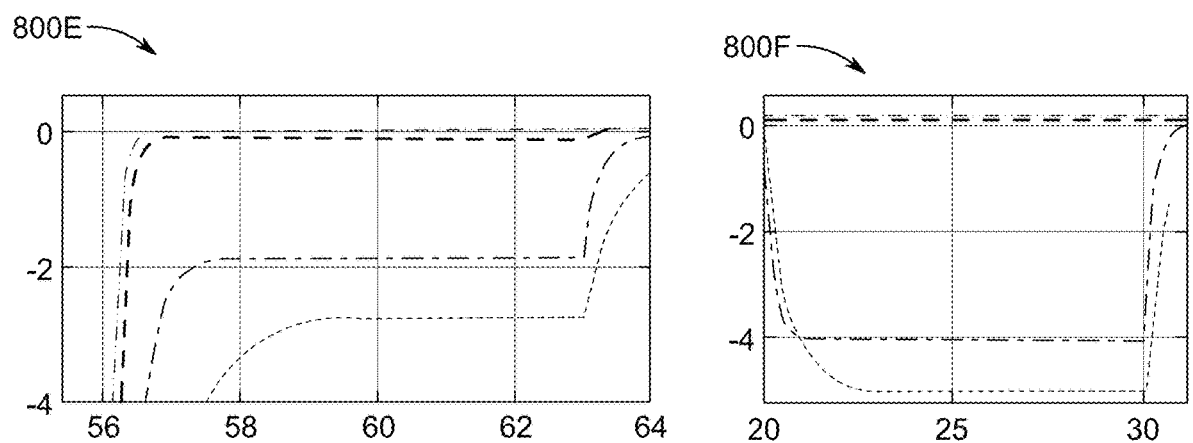
FIG. 8E
FIG. 8F

SYSTEM AND METHOD FOR CONTROLLING FUEL CELL HYBRID ELECTRIC VEHICLE WITH SENSOR FAULT TOLERANCE

STATEMENT REGARDING PRIOR DISCLOSURE BY THE INVENTORS

Aspects of the present disclosure are described in Maaruf, et al., "Neural learning fault-tolerant control of fuel cell-battery-ultracapacitor-based hybrid electric vehicle," Journal of Energy Storage, Volume 98, Part A (2024), 112892 which is incorporated herein by reference in its entirety.

BACKGROUND

Technical Field

The present disclosure is directed to energy management and control systems for electric vehicles, more particularly to a system and a method for controlling fuel cell hybrid electric vehicle (FCHEV) with sensor fault tolerance.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The reduction of carbon emissions has become a global priority, prompting a surge in research into the effective utilization of conventional and renewable energy resources. Recently, the automotive industry has been producing fuel cell electric vehicles to reduce environmental pollution as a result of carbon emissions from vehicles that use fossil fuels. Fuel cells generate electricity through electrochemical reactions with water and oxygen as byproducts. However, due to their limited ability to meet high-frequency power demands and store regenerative braking energy, fuel cells alone are insufficient to fully power electric drivetrains under dynamic driving conditions.

The solution to this problem is using batteries and/or ultracapacitors together with the fuel cells to power the drivetrain of the electric vehicle. The electric vehicle with multiple energy sources is commonly referred to as a fuel-cell hybrid electric vehicle (FCHEV). A dedicated energy management algorithm is usually employed to allocate the appropriate currents to the energy sources to meet the current demand for every driving condition of the FCHEV. The energy sources supply the target currents with the aid of controllers applied to their respective power converters.

In recent years, several control techniques have been forwarded for the energy management of FCHEVs. A non-linear dynamic model of the FCHEV system is derived, and nonlinear control is developed. To address the inherent nonlinearities and guarantee the asymptotic convergence of the FCHEV, a backstepping control scheme is indicated. An energy management strategy is proposed to minimize the fuel consumption of this FCHEV. a model predictive control is utilized to improve the efficiency of an FCHEV by optimizing its speed over a finite time horizon. Additionally, a variable structure sliding mode control was proposed to eliminate the chattering phenomena and achieve current tracking while maintaining the stability of the FCHEV system at all speeds. Further, a control algorithm is proposed for the effective techno-economic performance and power management of FCHEV. While these techniques offer asymptotic stability, they may exhibit slow convergence, especially under varying load conditions and real-world driving scenarios. Moreover, conventional control algorithms often assume fault-free operation, which may not reflect practical deployment environments.

Sensor faults, including drift, bias, and loss of effectiveness due to calibration issues or environmental influences, can critically compromise system performance and safety. Although existing fault-tolerant control has been applied to handle faults in converters and traction systems, very few existing systems address sensor faults in the energy sources of FCHEVs. This gap significantly impacts the system's ability to maintain accurate current tracking and overall performance.

Existing approaches also predominantly rely on integer-order calculus, which can limit robustness and adaptability. In contrast, fractional-order control strategies have demonstrated improved control performance and enhanced robustness in diverse applications, including spacecraft systems, microgrids, and robotic systems. Despite its proven advantages, fractional-order control remains largely unexplored in FCHEV energy management applications.

Furthermore, the concept of finite-time stability has gained traction for its ability to ensure system convergence within a predetermined time, thereby improving responsiveness in dynamic environments. Finite-time control has shown success in various systems such as quadrotors, unmanned vessels, and electric vehicles. However, existing methods for FCHEV energy management typically do not incorporate finite-time stability, thereby limiting their ability to ensure rapid adaptation under sudden changes in power demand or faults.

Hence, the existing control and energy management schemes for FCHEV are based on asymptotic convergence, which implies that the energy sources supply the desired current to the drive train as time approaches infinity. However, in the FCHEV operation, the convergence rate of the supplied current to the reference current is preferred to be as quick as possible to maintain the supply-demand balance for all driving conditions. Moreover, there is a need to improve the performance of the existing integer-order control strategies developed for the FCHEV in terms of tracking accuracy and robustness against parametric uncertainties. Furthermore, the presence of faults in the sensors of the FCHEV energy sources or direct current (DC)-link could seriously deteriorate the integrity of the system. Thus, formulating a control strategy that can handle sensor faults and parametric uncertainties, and improve the tracking accuracy in a short finite time is urgently needed.

US20240347818A1 describes a passivity-based control method for energy management in the FCHEVs, which provides accurate current distribution among energy sources. However, the system is based on asymptotic stability, implying delayed convergence in dynamic driving conditions. Moreover, the reference lacks mechanisms for handling sensor faults or external disturbances and does not incorporate learning-based fault estimation or fractional-order control principles.

CN117032209A discusses the control of underactuated ship systems but does not address FCHEVs or any form of energy source coordination. The reference focuses on actuator faults, omitting considerations for sensor fault management and energy storage integration that are critical for FCHEV operation.

Furthermore, existing control methods for FCHEVs focus primarily on achieving asymptotic tracking performance through feedback controllers and predictive strategies. The existing approaches often disregard the implications of sensor faults and require significant computational resources when neural networks are employed. The lack of adaptive learning frameworks and fault-resilient strategies in these approaches leaves the systems vulnerable to performance degradation in the presence of disturbances or sensor errors.

Therefore, there is a need for a system and a method that can overcome the limitations in the existing systems. One object of the present disclosure is to provide a method and system for fault-tolerant control of a fuel cell hybrid electric vehicle (FCHEV) that utilizes data from sensors that measure a current of a fuel cell, a current of a battery, and a current of an ultracapacitor, and a voltage of the DC-bus; preferably as embodied in a fuel cell hybrid electric vehicle.

SUMMARY

In an exemplary embodiment, a fault tolerant control system for a fuel cell hybrid electric vehicle (FCHEV) is disclosed. The fault tolerant control system includes a fuel cell, a battery, and an ultracapacitor connected to a DC-bus via a plurality of power converters. The fault tolerant control system includes a plurality of sensors configured to measure a current of the fuel cell, a current of the battery, and a current of the ultracapacitor, and a voltage of the DC-bus. The fault tolerant control system includes a controller operatively connected to the plurality of sensors and the plurality of power converters. The controller is configured to calculate a duty cycle value for each power converter in the plurality of power converters using a fractional-order sliding mode control strategy with finite-time stability. The controller is configured to use a radial basis function neural network (RBFNN) to estimate and compensate for a sensor fault occurring in at least one of the measured currents. The controller is configured to utilize a minimum learning parameter scheme configured to adjust the RBFNN through adaptation of a single parameter $\varrho_i = \Xi_i^T \Xi_i$, (i=1, 2, 3, 4), where $\Xi_i^T$ is a transpose of a weight vector, $\Xi_i$ is a weight vector, instead of a plurality of neural network weights. Further, the controller is configured to regulate a current distribution from the fuel cell, the battery, and the ultracapacitor to the DC-bus while maintaining the DC-bus voltage at a reference value despite the sensor fault.

In another exemplary embodiment, a method for controlling a fuel cell hybrid electric vehicle (FCHEV) with sensor fault tolerance is disclosed. The method includes receiving a current measurement of a fuel cell, a current measurement of a battery, and a current measurement of an ultracapacitor, and a voltage measurement of a DC-bus from a plurality of sensors. The method further includes detecting and estimating a sensor fault in at least one of the plurality of current measurements using a radial basis function neural network (RBFNN). The method further includes calculating a new value for a single parameter of the RBFNN according to a minimum learning parameter scheme instead of a plurality of individual neural network weights, thereby reducing computational burden. The method further includes calculating a duty cycle value for each power converter in the plurality of power converters using a fractional-order sliding mode control strategy with finite-time stability to compensate for the estimated sensor fault. The method further includes applying the calculated duty cycle value to a plurality of power converters that connect the fuel cell, the battery, and the ultracapacitor to the DC-bus, to maintain a current distribution despite the sensor fault.

In another exemplary embodiment, a non-transitory computer readable medium storing instructions that, when executed by one or more processor, cause the one or more processors to perform a method for controlling a fuel cell hybrid electric vehicle (FCHEV) with sensor fault tolerance is disclosed. The method includes receiving a current measurement of a fuel cell, a current measurement of a battery, and a current measurement of an ultracapacitor, and a voltage measurement of a DC-bus from a plurality of sensors. The method further includes detecting and estimating a sensor fault in at least one of the plurality of current measurements using a radial basis function neural network (RBFNN). The method further includes calculating a new value for a single parameter of the RBFNN according to a minimum learning parameter scheme instead of a plurality of individual neural network weights, thereby reducing computational burden. The method further includes calculating a duty cycle value for each power converter in the plurality of power converters using a fractional-order sliding mode control strategy with finite-time stability to compensate for the estimated sensor fault. The method further includes applying the calculated duty cycle value to a plurality of power converters that connect the fuel cell, the battery, and the ultracapacitor to the DC-bus, to maintain a current distribution despite the sensor fault.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A illustrates an exemplary graph depicting the simulation result of a comparison between the fault-tolerant controller and the existing controller for fuel cell current tracking, according to certain embodiments.

FIG. 7B illustrates an exemplary graph depicting the simulation result of a comparison between the fault-tolerant controller and the existing controller for battery current tracking, according to certain embodiments.

FIG. 7C illustrates an exemplary graph depicting the simulation result of a comparison between the fault-tolerant controller and the existing controller for ultracapacitor current tracking, according to certain embodiments.

FIG. 7G illustrates an exemplary graph 700G illustrating the simulation result of battery current tracking under parametric uncertainties.

FIG. 7H illustrates a portion of the curve of FIG. 7G
FIG. 7I illustrates a portion of the curve of FIG. 7G.

FIG. 7M illustrates an exemplary graph presenting a comparison of ultracapacitor current tracking performance under parametric uncertainties.

FIG. 7N illustrates a portion of the curve of FIG. 7M.
FIG. 7O illustrates a portion of the curve of FIG. 7M.

FIG. 7S illustrates a comparison of DC-link voltage regulation between a fault-tolerant controller and existing controllers under parametric uncertainties.

FIG. 7T illustrates a portion of the curve of FIG. 7S.
FIG. 7U illustrates a portion of the curve of FIG. 7S.

FIG. 8D illustrates an exemplary graph depicting the simulated comparison of DC bus voltage tracking between the fault-tolerant controller and existing controller when the FCHEV is simulated considering parametric uncertainties and sensor faults, according to certain embodiments.

FIG. 8E illustrates a portion of the curve of FIG. 8D.
FIG. 8F illustrates a portion of the curve of FIG. 8D.

DETAILED DESCRIPTION

Figure 1:
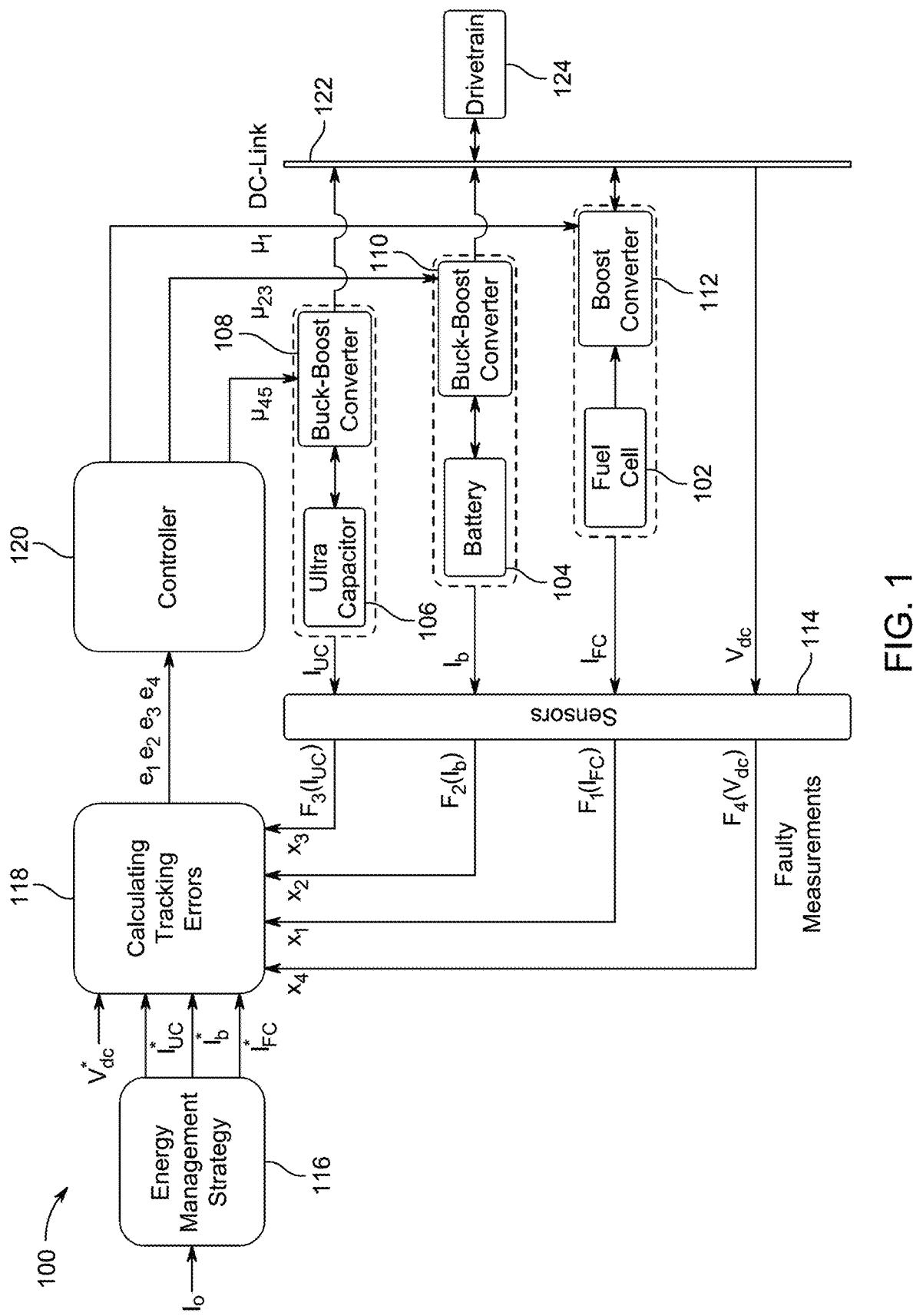
FIG. 1 illustrates an exemplary block diagram of a fault tolerant control system for a fuel cell hybrid electric vehicle (FCHEV), according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The existing control and energy management systems for Fuel Cell Hybrid Electric Vehicles (FCHEVs) predominantly rely on integer-order control strategies and asymptotic convergence methods. These conventional approaches often face challenges such as slow dynamic response, limited robustness against parametric uncertainties, and a lack of effective mechanisms to handle sensor faults. Moreover, existing systems are not well-equipped to ensure fault tolerance in the presence of measurement anomalies caused by calibration errors, environmental disturbances, or component degradation. The present disclosure provides, in one aspect, a fractional-order sliding mode control strategy with finite-time stability to enhance robustness, control accuracy and convergence rate; not a passivity-based control scheme characterized for example by asymptotic stability in which tracking performance may be achieved as time approaches infinity which is undesirable in practical applications.

The present disclosure overcomes the limitations of the existing systems by introducing a fault-tolerant control system for FCHEVs that integrates finite-time fractional-order sliding mode control with Radial Basis Function Neural Networks (RBFNNs). The proposed fault-tolerant control ensures rapid convergence of current tracking in a finite time, improved robustness to parametric uncertainties, and active compensation for sensor faults affecting current or voltage measurements. The present disclosure may exclude or not consider actuator faults. The system includes a fault estimation and compensation mechanism that utilizes neural networks with a minimal learning parameter scheme, enabling precise identification and correction of fault-induced deviations without compromising real-time performance.

The present disclosure further provides a system and method for energy management in FCHEVs, where multiple energy sources such as fuel cells, batteries, and ultracapacitors are coordinated to supply power based on real-time driving conditions. The system employs advanced control algorithms that dynamically allocate current demand to each source while maintaining DC bus voltage stability and prolonging the lifespan of critical components. The method enhances energy efficiency by minimizing degradation of the fuel cell during high power demands and efficiently capturing regenerative braking energy through the battery and ultracapacitor subsystems.

The system and method also support adaptability in varying driving conditions and operational uncertainties, making the present disclosure suitable for next-generation intelligent vehicle platforms requiring high-performance, fault-resilient, and energy-efficient control architectures.

Aspects of this disclosure are directed at a system and a method for controlling a fuel cell hybrid electric vehicle (FCHEV) with sensor fault tolerance. In order to control the sensor fault tolerance, the method includes receiving a current measurement of a fuel cell, a current measurement of a battery, and a current measurement of an ultracapacitor, and a voltage measurement of a DC-bus from a plurality of sensors. Upon receiving the current measurements, a sensor fault is detected and estimated in at least one of the plurality of current measurements using a radial basis function neural network (RBFNN). In addition, a new value for a single parameter of the RBFNN is calculated according to a minimum learning parameter scheme instead of a plurality of individual neural network weights, thereby reducing computational burden. Further, using a fractional-order sliding mode control strategy with finite-time stability a duty cycle value for each power converter is calculated in the plurality of power converters to compensate for the estimated sensor fault. Further, the calculated duty cycle value is applied to a plurality of power converters that connect the fuel cell, the battery, and the ultracapacitor to the DC-bus, to maintain a current distribution despite the sensor fault.

Referring now to FIG. 1, the present diagram provides an exemplary control flow diagram of a fault-tolerant control system 100 for a fuel cell hybrid electric vehicle (FCHEV), according to certain embodiments. The electric vehicle with multiple energy sources is commonly referred to as the FCHEV. The control flow diagram depicts a control strategy implemented in the fault-tolerant control system 100 that can handle sensor faults and parametric uncertainties and improve the tracking accuracy of the FCHEV in a short finite time.

The sensor faults refer to errors or abnormal behaviours in the signals measured by sensors due to hardware failure, environmental conditions, aging, or communication issues. Such sensor faults may severely impact the control performance and reliability of the FCHEV. The parametric uncertainties refer to the unknown or changing values of system parameters due to modeling errors, environmental variations, aging of components, or operating conditions. In order to control such sensor faults and the parametric uncertainties and improve tracking accuracy of the FCHEV, the fault-tolerant control system 100 includes a fuel cell 102, a battery 104, and an ultracapacitor 106 connected to a DC-link (also referred to as DC-bus) 112 via a plurality of power converters (e.g., buck-boost converters 108 and 110 and a boost converter 112). Further, the fault-tolerant control system 100 includes a plurality of sensors 114 and a controller 120 operatively connected to the plurality of sensors 114 and the plurality of power converters. Specifically, the fuel cell 102 is connected through a boost converter 112, the battery 104 through a bidirectional buck-boost converter 110, and the ultracapacitor 106 through a buck-boost converter 108.

The fuel cell 102 is an electrochemical device that converts the chemical energy of a fuel, such as hydrogen, directly into electrical energy through a chemical reaction with oxygen. In FCHEV, the fuel cell acts as the primary energy source for providing continuous power to drive an electric motor present in the FCHEV and charge auxiliary energy storage systems such as the battery and the ultracapacitor.

In an embodiment, the fuel cell 102, is the primary power-generating unit and is used to meet low traction current demand. During high traction current conditions, both the battery 104 and the fuel cell 102 operate to provide the required load current. On the other hand, in peak power or transient conditions, the ultracapacitor 106 is activated because of its high power density. When the FCHEV is decelerating, both the battery 104 and the ultracapacitor 106 are activated to store the braking energy, whereas the fuel cell 102 does not allow reverse flow of current. As depicted in FIG. 1, the current ($I_{FC}$) from the fuel cell 102, the current ($I_b$) from the battery 104, the current ($I_{UC}$) from the ultracapacitor 106 and a voltage ($V_{dc}$) from the DC-link 122 are routed to the plurality of sensors 114.

In an embodiment, the plurality of sensors 114 may experience various sensor fault conditions, including bias, drift, loss of accuracy, or loss of effectiveness. The output of the plurality of sensors 114 includes fault-affected current measurement signals denoted as F1($I_{FC}$), F1($I_b$), F1($I_{UC}$), F1($V_{dc}$), which are then processed into internal sensor state variables $x_1$, $x_2$, $x_3$, and $x_4$, respectively. The output is input to a tracking error computation module 118 for calculating tracking errors.

Also, an energy management strategy block 116 receives an input signal representing the load current demand $I_0$ and computes corresponding desired current values for fuel cell 102, the battery 104, the ultracapacitor 106 and the desired voltage such as $I^*_{FC}$, $I^*_b$, $I^*_{UC}$ and $V^*_{dc}$ based on the instantaneous traction requirements and vehicle operating conditions.

The desired currents of the battery computed as follows:

$$I^*_b = \begin{cases} 15 & \text{for } K_b(I_o - I^*_{FC}) > 15 \\ K_b(I_o - I^*_{FC}) & \text{for } -15 \leq K_b(I_o - I^*_{FC}) \leq 15 \\ -15 & \text{for } K_b(I_o - I^*_{FC}) < -15 \end{cases}$$

The desired ultracapacitor current is computed as follows:

$$I^*_{UC} = I_o - I^*_{FC} - I^*_b$$

where $$K_b = \frac{\pi_b}{\pi_b + s}$$

is a low-pass filter, and $\pi_b$ if the filter cut-off frequency.

In an embodiment, the desired currents $I^*_{FC}$, $I^*_B$, are calculated using a filter-based strategy. These reference values are transmitted to the tracking error computation module 118 to calculate the tracking error signals $e_1$, $e_2$, $e_3$, and $e_4$ which denote the deviation between the desired (reference) and measured current values.

In an embodiment, the tracking errors are subsequently routed to the controller 120 implementing a fault-tolerant fractional-order sliding mode control scheme with finite-time convergence properties. The controller 120 is augmented with a radial basis function neural network (RBFNN) configured to estimate and compensate sensor faults and parametric uncertainties via a minimum learning parameter adaptation rule.

The single parameter may be expressed as equation (1)

$$\varrho_i = \Xi_i^T \Xi_i, (i=1, 2, 3, 4); \tag{1}$$

where $\Xi_i^T$ is a transpose of a weight vector, $\Xi_i$ is a weight vector, instead of a plurality of neural network weights;

In an embodiment, the fractional-order sliding mode control algorithm utilizes a fractional calculus according to a Caputo definition as shown in equation (2)

$$a\mathcal{D}_t^\gamma = \begin{cases} \dfrac{1}{\Gamma(n-\gamma)} \int_a^t \dfrac{f(\tau)}{(t-\tau)^{\gamma-n+1}}, & n-1 < \gamma < n \\ \dfrac{d^n}{dt^n} f(\tau) \gamma = n \end{cases} \tag{2}$$

where $\mathcal{D}_t^\gamma$ represents a fractional derivative of order $\gamma$ with respect to t, $f(t)$ is a continuous function, a and t are limit values of integration, $\gamma$ is the fractional order with $\gamma > 0$, n is the smallest integer greater than $\gamma$ (thus n>0), and $\Gamma(\cdot)$ is a gamma function.

In an embodiment, the controller 120 is configured to utilize a fractional-order sliding mode surface defined by:

$$\zeta_i = e_i + \kappa_i \mathcal{D}^{\gamma-1}(\text{sgn}^\alpha(e_i)); \tag{3}$$

where $e_i$ is a tracking error variable, $\kappa_i$ is a constant coefficient, $\gamma$ is a fractional order, $\alpha$ is a power exponent, sgn is the sign function, and i represents an index for the fuel cell, battery, ultracapacitor, and DC-bus voltage.

In an embodiment, the controller 120 is configured to establish finite-time stability of the fault-tolerant control system 100 using a Lyapunov function as shown in equation (4)

$$W = \frac{1}{2}\zeta_1^2 + \frac{1}{2}\zeta_2^2 + \frac{1}{2}\zeta_3^2 + \frac{1}{2}\zeta_4^2 + \frac{1}{2c_1}\tilde{\varrho}_1^2 \tag{4}$$

Based on the tracking errors and estimated fault signals, the controller 120 generates optimal duty cycle control signals inputs $\mu_1$, $\mu_{23}$, and $\mu_{45}$ for each power converter interfacing the fuel cell 102, the battery 104, and the ultracapacitor 106.

These control signals modulate the respective the boost converter 112 and the buck-boost converters 108 and 110 to ensure regulated power is injected into the DC-link 122. The stabilized DC-link voltage is then supplied to the drivetrain 124, thereby maintaining load fulfillment and system robustness despite sensor faults and system uncertainties.

Although FIG. 1 shows exemplary components of the fault-tolerant control system 100, in other embodiments, the fault-tolerant control system 100 may include fewer components, different components, differently arranged components, or additional functional components than depicted in FIG. 1. Additionally, or alternatively, one or more components of the fault-tolerant control system 100 may perform functions described as being performed by one or more other components of the fault-tolerant control system 100.

Figure 2:
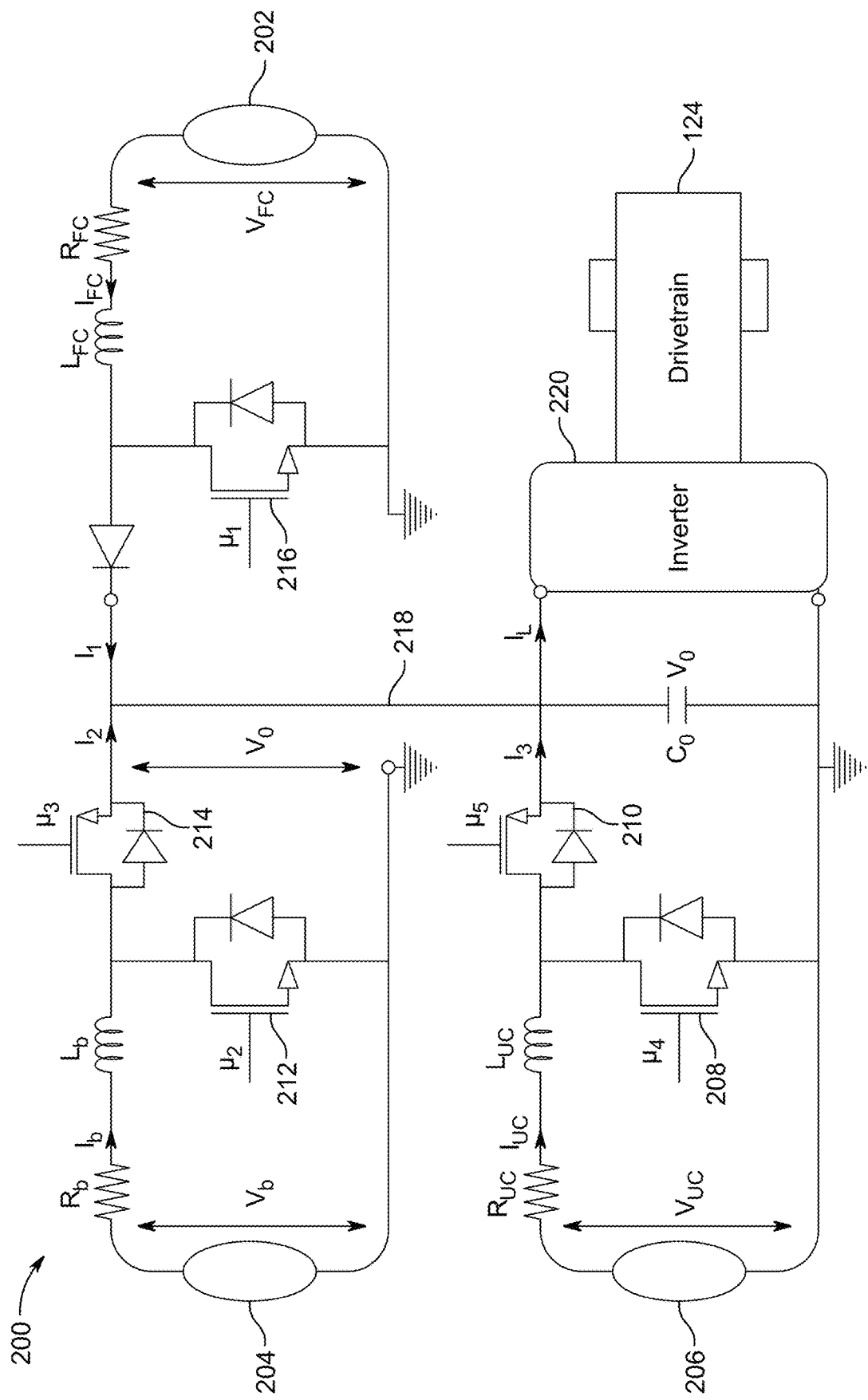
FIG. 2 illustrates an exemplary circuit diagram of the FCHEV, according to certain embodiments.

FIG. 2 illustrates an exemplary circuit diagram 200 of the FCHEV, according to certain embodiments.

The circuit diagram 200 of the FCHEV consists of the fuel cell 202, the battery 204, and the ultracapacitor 206 connected to the DC-link 218 via the boost converter (for e.g., 216), the buck-boost converters (for e.g., 208, 210, 212 and 214) and respectively. The DC-link 218 transfers the DC power generated by the energy sources such as the fuel cell 202, the battery 204 and the ultracapacitor 206 to the drivetrain 124 (also referred to as traction motor) through a DC-AC inverter 220.

In an embodiment, the drivetrain 124 draws current from the energy sources according to the driving condition. The fuel cell 202 is the primary power generating unit and is used to meet low traction current demand. During high traction current conditions, both the battery 204 and fuel cell 202 are operating to provide the required load current. On the other hand, in peak power or transient conditions, the ultracapacitor 208 is activated because of its high power density. When the vehicle is decelerating, both the battery 204 and ultracapacitor 208 are activated to store the braking energy whereas the fuel cell 202 does not allow reverse flow of current.

In an embodiment, the fuel cell 202 generates electrical power through an electrochemical reaction of hydrogen gas and oxygen. The output voltage of the fuel cell 202 may be denoted as shown in equation (5).

$$V_{FC} = E_{FC} - V_{act} - V_{conc} - V_{ohm}; \tag{5}$$

where $E_{FC}$ is the open circuit voltage, $V_{act}$ is the activation voltage drop, $V_{conc}$ is the concentration voltage drop, $V_{ohm}$ is the concentration voltage drop.

In an embodiment, the dynamic model of the fuel cell's boost converter is derived using Kirchhoff's voltage law as shown in FIG. 2 and equation (6) and (7)

$$L_{FC}\frac{dI_{FC}}{dt} = V_{FC} - R_{FC}I_{FC} - (1-\mu_1)V_{dc} \tag{6}$$

$$I_1 = (1-\mu_1)I_{FC} \tag{7}$$

where $I_{FC}$ and $R_{FC}$ are fuel cell current output and resistance, respectively, $\mu_1$ is the duty cycle of the boost converter 216, and $V_{dc}$ is the DC-link voltage.

In an embodiment, the charging and discharging of the battery 204 depend on the driving condition of the FCHEV. The terminal voltage of the battery may be expressed as shown in equation (8)

$$V_b = V_{dc} - \frac{Q_b}{Q_b - \int I_b dt} + A_1 e^{(A_2 \int I_b dt)} \tag{8}$$

where $V_{dc}$ and $V_b$ are the constant voltage and open circuit voltage, respectively, $I_b$ is the battery current, $A_1$ and $A_2$ are battery parameters, and $Q_b$ is the battery rated capacity. The battery is connected to the DC-link 218 through the buck-boost converter (for e.g., 208). It functions as a buck converter when charging and as a boost converter when discharging. A binary variable $\overline{\omega}_b$ is defined as shown in equation (9):

$$\varpi_b = \begin{cases} 0, & I_b^* < 0 \quad \text{(charging)} \\ 1, & I_b^* > 0 \quad \text{(discharging)} \end{cases} \qquad (9)$$

where $I^*_b$ stands for the desired battery current. The dynamic equation of the battery buck-boost converter during the charging mode is expressed as shown in equation (10) and (11):

$$L_b \frac{dI_b}{dt} = V_b - I_b R_b - (1 - \mu_2)V_{dc} \qquad (10)$$

$$I_2 = (1 - \mu_2)I_b \qquad (11)$$

where $R_b$ is the internal resistance, and $\mu_2$ is the converter duty cycle during the charging mode. Moreover, the dynamic equation of the battery buckboost converter during the discharging mode is obtained as:

$$L_b \frac{dI_b}{dt} = V_b - I_b R_b - \mu_3 V_{dc} \qquad (12)$$

$$I_2 = \mu_3 I_b \qquad (13)$$

where $\mu_3$ is the converter duty cycle during the discharging mode. To obtain the average model of the converter, a fictitious variable (14) is defined. Thus, the average model is derived as follows:

$$\mu_{23} = [\varpi_b(1 - \mu_2) + (1 - \varpi_b)\mu_3] \qquad (14)$$

$$L_b \frac{dI_b}{dt} = V_b - I_b R_b - \mu_{23} V_{dc} \qquad (15)$$

$$I_2 = \mu_{23} I_b \qquad (16)$$

In an embodiment, similar to the battery 204, the ultracapacitor 206 is an energy storage device and can charge or discharge depending on the driving conditions. The ultracapacitor 206 can charge or discharge large amounts of power within a very short period of their high power density. The output voltage of the ultracapacitor is expressed as shown in equation 17:

$$V_{UC} = V_{UC_0} e^{-\left(\frac{t}{R_{UC} C_{UC}}\right)} \qquad (17)$$

where $V_{UC_0}$ and $V_{UC}$ denote the initial and final voltages of the ultracapacitor, respectively, and $C_{UC}$ is the capacitance of the ultracapacitor. Similar to the battery, binary variable $\overline{\omega}_{UC}$ such is defined as shown in equation 18:

$$\varpi_{UC} = \begin{cases} 0, & I_{UC}^* < 0 \quad \text{(charging)} \\ 1, & I_{UC}^* > 0 \quad \text{(discharging)} \end{cases} \qquad (18)$$

where $I^*_{UC}$ denotes the desired ultracapacitor current. The dynamic equation of the ultracapacitor converter during the discharging is expressed as:

$$L_{UC} \frac{dI_{UC}}{dt} = V_{UC} - I_{UC} R_{UC} - (1 - \mu_4)V_{dc} \qquad (19)$$

$$I_3 = (1 - \mu_4)I_{UC} \qquad (20)$$

where $I_{UC}$ is the ultracapacitor current, $R_{UC}$ is the internal resistance of the ultracapacitor, $\mu_3$ is the converter duty cycle during the charging mode. When charging, the converter dynamic equation is written as follows:

$$L_{UC} \frac{dI_{UC}}{dt} = V_{UC} - I_{UC} R_{UC} - \mu_5 V_{dc} \qquad (21)$$

$$I_3 = \mu_5 I_{UC} \qquad (22)$$

By integrating (19) and (21), the average dynamic model of the ultracapacitor converter is derived as follows:

$$L_{UC} \frac{dI_{UC}}{dt} = V_{UC} - I_{UC} R_{UC} - \mu_{45} V_{dc} \qquad (23)$$

$$I_3 = \mu_{45} I_{UC} \qquad (24)$$

where $\mu_{45}$ is a fictitious variable expressed as $$\mu_{45} = [\overline{\omega}_{UC}(1-\mu_4) + (1-\overline{\omega}_{UC})\mu_5] \qquad (25)$$

To derive the dynamic equation of the DC-link, the Kirchhoff's current law was used which is given by:

$$C_0 \frac{dV_{dc}}{dt} + I_o = I_1 + I_2 + I_3 \qquad (26)$$

$$C_0 \frac{dV_{dc}}{dt} = (1 - \mu_1)I_{FC} + \mu_{23} I_b + \mu_{45} I_{UC} - I_o \qquad (27)$$

To drive the traction motor, an electric power that is large enough to overcome motor torque and frictional forces is required. Given that the speed profile is available, the total load power, $P_o$, needed by the traction motor can be calculated as follows.

$$P_o = \frac{1}{0.85}\left[M \frac{dv_s}{dt} + 0.5\lambda_a A C_x v_s^2 + M g C_r\right] v_s \qquad (28)$$

where $v_s$ is the speed of the vehicle, $C_x$, $C_r$, and $\lambda_a$ denote the drag coefficient, rolling resistance, and air density, respectively, g is the gravity constant, A and M denote the frontal surface and mass of the vehicle, respectively, and 0.85 is the assumed inverter efficiency. Noting that the total load power is $P_o = I_o V_{dc}$, the total load current can be calculated as follows:

$$I_o = \frac{1}{0.85 V_{dc}}\left[M \frac{dv_s}{dt} + 0.5\lambda_a A C_x v_s^2 + M g C_r\right] v_s \qquad (29)$$

From (6), (15), (23), and (27), the dynamic equations of the FCHEV system is thus:

$$\frac{dI_{FC}}{dt} = (V_{FC} - R_{FC} I_{FC} - (1 - \mu_1)V_{dc})L_{FC}^{-1} + \Delta_1 \qquad (30)$$

-continued $$\frac{dI_b}{dt} = (E_b - R_b I_b - \mu_{23} V_{dc}) L_b^{-1} + \Delta_2 \quad (31)$$

$$\frac{dI_{UC}}{dt} = (V_{UC} - R_{UC} I_{UC} - \mu_{45} V_{dc}) L_{UC}^{-1} + \Delta_3 \quad (32)$$

$$\frac{dV_{dc}}{dt} = ((1 - \mu_1) I_{FC} + \mu_{23} I_b + \mu_{45} I_{UC} - I_o) L_{FC}^{-1} + \Delta_4 \quad (33)$$

where $\Delta_i$, (i=1, 2, 3, 4) represent the lumped dynamic uncertainties and external disturbances. The multi-input-multi-output nonlinear system (30) (33) can be controlled by manipulating $\mu_1$, $\mu_{23}$, and $\mu_{45}$ to obtain the desired outputs of $I_{FC}$, $I_b$, $I_{UC}$, and $V_{dc}$.

In an embodiment, the current measurements of the fuel cell 202, the battery 204 and the ultracapacitor 206 is given as inputs to the plurality of sensors. Further $x_1$, $x_2$, $x_3$ and $x_4$ are defined as the sensor outputs corresponding to the measuring of $I_{FC}$, $I_b$, $I_{UC}$, and $V_{dc}$, respectively. The sensor faults are written as:

$$\begin{cases} x_1 = F_1(I_{FC}) = \sigma_1(t) I_{FC} + \varsigma_1(t) \\ x_2 = F_2(I_b) = \sigma_2(t) I_b + \varsigma_2(t) \\ x_3 = F_3(I_{UC}) = \sigma_3(t) I_{UC} + \varsigma_3(t) \\ x_4 = F_4(V_{dc}) = \sigma_4(t) V_{dc} + \varsigma_4(t) \end{cases} \quad (34)$$

where $\sigma_i(t)$ and $\varsigma_i(t)$ (i=1, 2, 3, 4) are parameters of sensor faults. The term $\sigma_i(t)$ denotes the loss of effectiveness and $\bar{\sigma}_{i,min} \leq \sigma_i(\cdot) \leq 1$ with $\bar{\sigma}_{i,min} > 0$ being the least sensor effectiveness, $-\bar{\varsigma}_i$ and $\grave{\varsigma}_i > 0$ shows the loss of accuracy, drift, and bias such that $-\bar{\varsigma}_i \leq \varsigma_i(\cdot) \leq \grave{\varsigma}_i$ with $-\bar{\varsigma}_i$ and $\grave{\varsigma}_i$ being lower and upper bounds. The parameters of the sensor fault are described as follows:

1. $\sigma_i(\cdot)=1$ and $|\varsigma_i(\cdot)|=\text{o}t$, with $0<t<<1$, indicates drift fault.
2. $\sigma_i(\cdot)=1$ and $|\varsigma_i(\cdot)|<\bar{\varsigma}_i$, with $\varsigma_i(\cdot)\to 0$, indicates loss of accuracy.
3. $\sigma_i(\cdot)=1$ and $\varsigma_i(\cdot)$ is a constant, indicates bias fault.
4. $\varsigma_i(\cdot)=0$ and $0<\bar{\sigma}_{i,min}\leq\sigma_i(\cdot)<1$, indicates loss of effectiveness.

Based on the analysis in [28, 29], (34) can be expressed as:

$$\begin{cases} x_1 = \prod_1 + I_{FC} \\ x_2 = \prod_2 + I_b \\ x_3 = \prod_3 + I_{UC} \\ x_4 = \prod_4 + V_{dc} \end{cases} \quad (35)$$

where $\Pi_1 = F_1(I_{FC}) - I_{FC}$, $\Pi_2 = F_2(I_b) - I_b$, $\Pi_3 = F_3(I_{UC}) - I_{UC}$, and $\Pi_4 = F_4(V_{dc}) - V_{dc}$.

In an embodiment, the sensor variables $x_1$, $x_2$, $x_3$, and $x_4$ is controlled to guarantee the fault-tolerant and excellent tracking performance of the fuel cell, battery, ultracapacitor, and DC-link voltage according to the power allocation.

The control formulation and energy management is described herein. An appropriate energy management scheme is needed to coordinate the energy sources to provide the required electric power to the traction motor for all driving conditions. The desired current of each energy source is calculated by distributing the load current (29) among them as follows:

$$I^*_b + I^*_{FC} + I^*_{UC} = I_o \quad (36)$$

where $I^*_{FC}$, $I^*_b$, and $I^*_{UC}$ are the desired currents of the fuel cell, battery, and ultracapacitor, respectively. The desired currents $I^*_{FC}$, $I^*_b$ are calculated using the filter-based strategy. The flowchart of the energy management scheme is depicted in FIG. 3.

Figure 3:
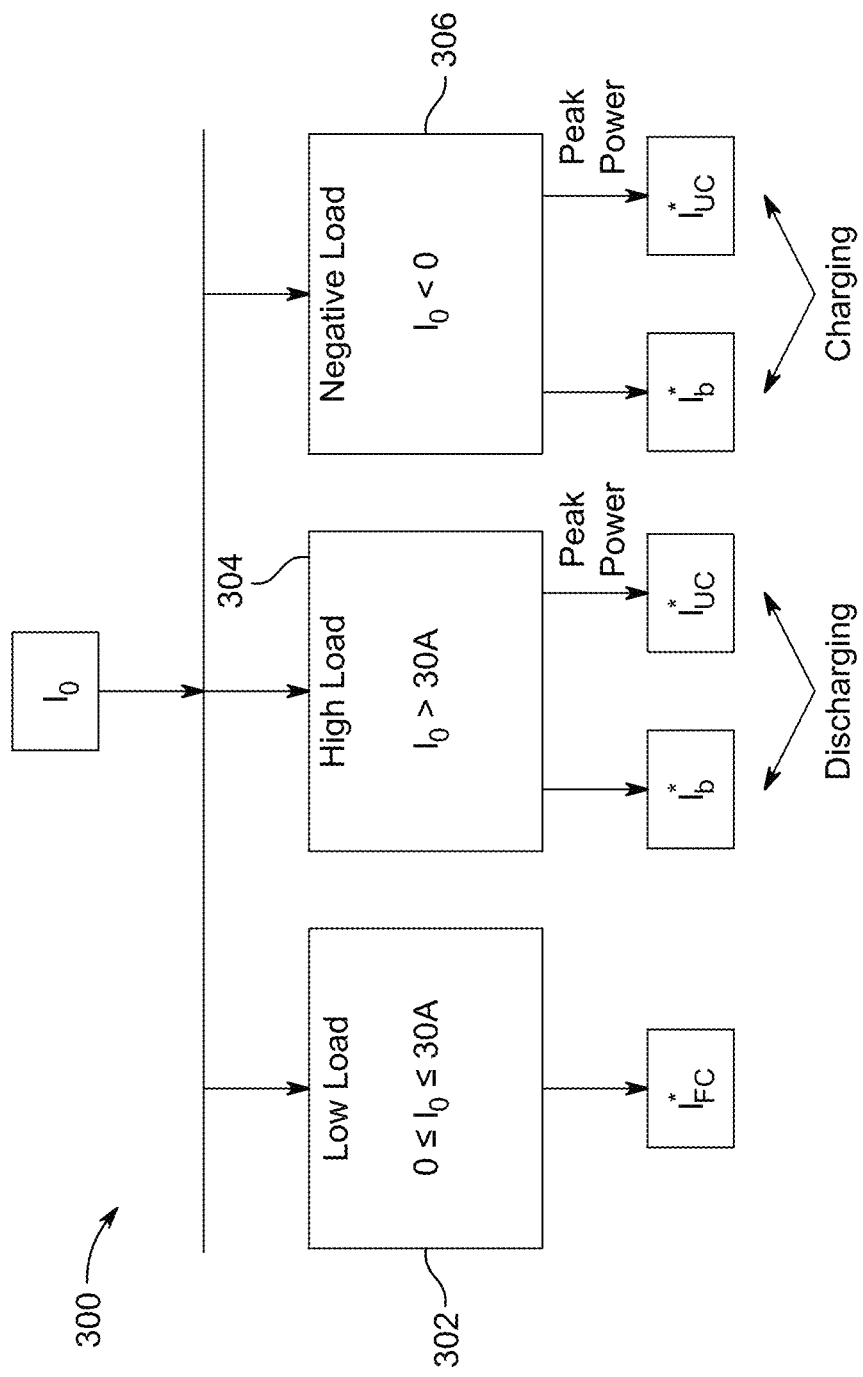
FIG. 3 illustrates an exemplary process flowchart of an energy management scheme used in the FCHEV, according to certain embodiments.

Referring now to FIG. 3, the present diagram provides an exemplary process flowchart of an energy management scheme used in the FCHEV, according to certain embodiments.

At step 302, a low load process is shown. In the low current load the fuel cell is the main energy source for $0<I_o<30A$ and does not allow the reverse flow of current. Therefore, the fuel cell cannot supply current beyond 30 A to prevent its degradation. The desired fuel cell current is computed as follows:

$$I^*_{FC} = \begin{cases} 0 & \text{for } K_{FC} \cdot I_o \leq 0 \\ K_{FC} \cdot I_o & \text{for } K_{FC} \cdot I_o > 0 \\ 30 & \text{for } K_{FC} \cdot I_o > 30 \end{cases} \quad (37)$$

where $$K_{FC} = \frac{\pi_{FC}}{\pi_{FC} + s}$$

is a low-pass filter, and $\pi_{FC}$ is the filter cut-off frequency.

At step 304, a high load process is shown. Since the fuel cell cannot meet a load demand of $I_o>30$ A, the battery supplements it to meet the load demand. However, the battery cannot supply a current of $I^*_b>15A$ to preserve its health and lifespan. Due to the high power density of the ultracapacitor, it takes care of the peak load demand that the battery cannot meet.

At step 306, a negative load process is shown. During deceleration, the battery and ultracapacitor are active. The battery recovers the regenerative braking energy up to $I^*_b>=-15A$ to prevent overcharging. For any regenerative current less than $-15A$, the ultracapacitor recovers it due to its high power density.

The desired currents of the battery computed as follows:

$$I^*_b = \begin{cases} 15 & \text{for } K_b(I_o - I^*_{FC}) > 15 \\ K_b(I_o - I^*_{FC}) & \text{for } -15 \leq K_b(I_o - I^*_{FC}) \leq 15 \\ -15 & \text{for } K_b(I_o - I^*_{FC}) < -15 \end{cases} \quad (38)$$

The desired ultracapacitor current is computed as follows:

$$I^*_{UC} = I_o - I^*_{FC} - I^*_b \quad (39)$$

where $$K_b = \frac{\pi_b}{\pi_b + s}$$

is a low-pass filter, and $\pi_b$ if the filter cut-off frequency.

Referring back to FIG. 1, the sensor variables $x_1$, $x_2$, $x_3$, and $x_4$ are controlled to achieve the fault tolerant and excellent tracking performance of the fuel cell, battery, ultracapacitor, and DC-link voltage according to the power allocation. The procedure for designing the disclosed FCHEV controller 120 is given as follows: Define the tracking error variables $e_1$, $e_2$, $e_3$, and $e_4$ as:

$$e_1 = x_1 - I^*_{FC} = I_{FC} + \Pi_1 - I^*_{FC} \quad (40)$$

$$e_2 = x_2 - I^*_b = I_b + \Pi_2 - I^*_b \tag{41}$$

$$e_3 = x_3 - I^*_{UC} = I_{UC} + \Pi_3 - I^*_{UC} \tag{42}$$

$$e_4 = x_4 - V^*_{dc} = V_{dc} + \Pi_4 - V^*_{dc} \tag{43}$$

where $V^*_{dc}$, is the desired DC-link voltage. The time-derivatives for the tracking errors (40)-(43) is obtained as follows:

$$\dot{e}_1 = (V_{FC} - R_{FC}I_{FC} - (1-u_1)V_{dc})L_{FC}^{-1} + \Delta_1 + \dot{\Pi}_1 - \dot{I}^*_{FC} \tag{44}$$

$$\dot{e}_2 = (E_b - R_b I_b - u_2 V_{dc})L_b^{-1} + \Delta_2 + \dot{\Pi}_2 - \dot{I}^*_b \tag{45}$$

$$\dot{e}_3 = (V_{UC} - R_{UC}I_{UC} - u_3 V_{dc})L_{UC}^{-1} + \Delta_3 + \dot{\Pi}_3 - \dot{I}^*_{UC} \tag{46}$$

$$\dot{e}_4 = (1-u_1)I_{FC} + u_2 I_b + u_3 I_{UC} - I_o)L_{dc}^{-1} + \Delta_4 + \dot{\Pi}_4 - u_4 \tag{47}$$

The unknown lumped disturbances $\Delta_i$ and faults $\dot{\Pi}_i$, ($i=1, 2, 3, 4$) and are estimated using the neural networks.

$$\Delta_1 + \dot{\Pi}_1 = \Xi_1^T \phi_1(Z_1) + \varepsilon_1(Z_1) \tag{48}$$

$$\Delta_2 + \dot{\Pi}_2 = \Xi_2^T \phi_2(Z_2) + \varepsilon_2(Z_2) \tag{49}$$

$$\Delta_3 + \dot{\Pi}_3 = \Xi_3^T \phi_3(Z_3) + \varepsilon_3(Z_3) \tag{50}$$

$$\Delta_4 + \dot{\Pi}_4 = \mu \Xi_4^T \phi_4(Z_4) + \varepsilon_4(Z_4) \tag{51}$$

Remark 1. Let $\varrho_i = \Xi_i^T \Xi_i$, ($i=1, 2, 3, 4$) be an unknown parameter with $\dot{\varrho}_i$ as the estimate of $\varrho_i$. The adaptive parameter $\dot{\varrho}_i$ will be updated in real-time as a substitute of $\Xi_i$ to lessen the computational cost.

The following fractional-order sliding mode surfaces are designed:

$$\zeta_1 = e_1 + \kappa_1 \mathcal{D}^{\gamma-1}(\text{sgn}^\alpha(e_1)) \tag{52}$$

$$\zeta_2 = e_2 + \kappa_2 \mathcal{D}^{\gamma-1}(\text{sgn}^\alpha(e_2)) \tag{53}$$

$$\zeta_3 = e_3 + \kappa_3 \mathcal{D}^{\gamma-1}(\text{sgn}^\alpha(e_3)) \tag{54}$$

$$\zeta_4 = e_4 + \kappa_4 \mathcal{D}^{\gamma-1}(\text{sgn}^\alpha(e_4)) \tag{55}$$

The time-derivative of the above sliding mode surfaces gives:

$$\dot{\zeta}_1 = \dot{e}_1 + \kappa_1 \mathcal{D}^1 \mathcal{D}^{\gamma-1}(\text{sgn}^\alpha(e_1)) \tag{56}$$

$$\dot{\zeta}_2 = \dot{e}_2 + \kappa_2 \mathcal{D}^1 \mathcal{D}^{\gamma-1}(\text{sgn}^\alpha(e_2)) \tag{57}$$

$$\dot{\zeta}_3 = \dot{e}_3 + \kappa_3 \mathcal{D}^1 \mathcal{D}^{\gamma-1}(\text{sgn}^\alpha(e_3)) \tag{58}$$

$$\dot{\zeta}_4 = \dot{e}_4 + \kappa_4 \mathcal{D}^1 \mathcal{D}^{\gamma-1}(\text{sgn}^\alpha(e_4)) \tag{59}$$

To derive the fault-tolerant controller, the following Lyapunov candidate function is chosen.

$$W = \frac{1}{2}\zeta_1^2 + \frac{1}{2}\zeta_2^2 + \frac{1}{2}\zeta_3^2 + \frac{1}{2}\zeta_4^2 + \frac{1}{2c_1}\tilde{\varrho}_1^2 \tag{60}$$

where $c_i > 0$ ($i=1, 2, 3, 4$) is a design parameter, $\tilde{\varrho}_i = \varrho_i - \dot{\varrho}_i$ ($i=1, 2, 3, 4$) is the weight estimation error, with $\dot{\varrho}_i$ being the estimate of $\varrho_i$.

The time derivative of the energy function (60) is $$\dot{W} = \zeta_1 \dot{\zeta}_1 + \zeta_2 \dot{\zeta}_2 + \zeta_3 \dot{\zeta}_3 + \zeta_4 \dot{\zeta}_4 - \frac{1}{c_1}\tilde{\varrho}_1 \dot{\varrho}_1 \tag{61}$$

Evaluating (61) yields the following result.

$$W = \zeta_1 \begin{pmatrix} (V_{FC} - R_{FC}I_{FC} - (1-u_1)V_{dc})L_{FC}^{-1} + \Xi_1^T \Phi_1(Z_1) \\ + \varepsilon_1(Z_1) - \dot{I}^*_{FC} + \kappa_1 \mathcal{D}^\gamma(\text{sgn}^\alpha(e_1)) \end{pmatrix} + \tag{62}$$
$$\zeta_2 \begin{pmatrix} (E_b - R_b I_b - u_2 V_{dc})L_b^{-1} + \Xi_2^T \Phi_2(Z_2) \\ + \varepsilon_2(Z_2) - \dot{I}^*_b + \kappa_2 \mathcal{D}^\gamma(\text{sgn}^\alpha(e_2)) \end{pmatrix} +$$
$$\zeta_3 \begin{pmatrix} (V_{UC} - R_{UC}I_{UC} - u_3 V_{dc})L_{UC}^{-1} + \Xi_3^T \Phi_3(Z_3) \\ + \varepsilon_3(Z_3) - \dot{I}^*_{UC} + \kappa_3 \mathcal{D}^\gamma(\text{sgn}^\alpha(e_3)) \end{pmatrix} +$$
$$\zeta_4 \begin{pmatrix} ((1-u_1)I_{FC} + u_2 I_b + u_3 I_{UC} - I_o)L_{dc}^{-1} + \Xi_4^T \Phi_4(Z_4) \\ + \varepsilon_4(Z_4) - u_4 + \kappa_4 \mathcal{D}^\gamma(\text{sgn}^\alpha(e_4)) \end{pmatrix}$$

From (62)

$$\zeta_i \Xi_i^T \Phi_i(Z_i) \leq \zeta_i \|\Xi_i\| \|\Phi_i\| \leq \frac{\zeta_i^2 \varrho_i \Phi_i^T \Phi_i}{2} + \frac{1}{2} \tag{63}$$

where $\varrho_i = \Xi_i^T \Xi_i$ will estimated later.
Substituting (63) into (62) gives:

$$W = \zeta_1 \begin{pmatrix} (V_{FC} - R_{FC}I_{FC} - (1-u_1)V_{dc})L_{FC}^{-1} + \frac{\zeta_2 \varrho_2 \Phi_2^T \Phi_2}{2} \\ + \varepsilon_1(Z_1) - \dot{I}^*_{FC} + \kappa_1 \mathcal{D}^\gamma(\text{sgn}^\alpha(e_1)) \end{pmatrix} + \tag{64}$$
$$\zeta_2 \begin{pmatrix} (E_b - R_b I_b - u_2 V_{dc})L_b^{-1} + \frac{\zeta_2 \varrho_2 \Phi_2^T \Phi_2}{2} \\ + \varepsilon_2(Z_2) - \dot{I}^*_b + \kappa_2 \mathcal{D}^\gamma(\text{sgn}^\alpha(e_2)) \end{pmatrix} +$$
$$\zeta_3 \begin{pmatrix} (V_{UC} - R_{UC}I_{UC} - u_3 V_{dc})L_{UC}^{-1} + \frac{\zeta_3 \varrho_3 \Phi_3^T \Phi_3}{2} \\ + \varepsilon_3(Z_3) - \dot{I}^*_{UC} + \kappa_3 \mathcal{D}^\gamma(\text{sgn}^\alpha(e_3)) \end{pmatrix} +$$
$$\zeta_4 \begin{pmatrix} ((1-u_1)I_{FC} + u_2 I_b + u_3 I_{UC} - I_o)L_{dc}^{-1} + \frac{\zeta_4 \varrho_4 \Phi_4^T \Phi_4}{2} \\ + \varepsilon_4(Z_4) - u_4 + \kappa_4 \mathcal{D}^\gamma(\text{sgn}^\alpha(e_4)) \end{pmatrix}$$

The fault-tolerant control laws are designed as follows:

$$u_1 = \begin{pmatrix} (V_{FC} - R_{FC}I_{FC})L_{FC}^{-1} - \dot{I}^*_{FC} \\ -\frac{\dot{\varrho}_1 \zeta_1 \Phi_1^T \Phi_1}{2} + \kappa_1 \mathcal{D}^\gamma(\text{sgn}^\alpha(e_1)) + r_1 \end{pmatrix} \frac{L_{FC}}{V_{dc}} \tag{65}$$

$$u_2 = \begin{pmatrix} (E_b - R_b I_b)L_b^{-1} - \dot{I}^*_b - \frac{\dot{\varrho}_2 \zeta_2 \Phi_2^T \Phi_2}{2} \\ + \kappa_2 \mathcal{D}^\gamma(\text{sgn}^\alpha(e_2)) + r_2 \end{pmatrix} \frac{L_b}{V_{dc}} \tag{66}$$

$$u_3 = \begin{pmatrix} (V_{UC} - R_{UC} + I_{UC})L_{UC}^{-1} - \dot{I}^*_{UC} - \frac{\dot{\varrho}_3 \zeta_3 \Phi_3^T \Phi_3}{2} \\ + \kappa_2 \mathcal{D}^\gamma(\text{sgn}^\alpha(e_3)) + r_3 \end{pmatrix} \frac{L_{UC}}{V_{dc}} \tag{67}$$

$$u_4 = \begin{pmatrix} ((1-u_1)I_{FC} + u_2 I_b + u_3 I_{UC} - I_o)L_{dc}^{-1} \\ -\frac{\dot{\varrho}_4 \zeta_4 \Phi_4^T \Phi_4}{2} + \kappa_4 \mathcal{D}^\gamma(\text{sgn}^\alpha(e_4)) + r_4 \end{pmatrix} \tag{68}$$

where $r_i$ ($i=1, 2, 3, 4$) are robust terms chosen as follows:

$$r_1 = -\lambda_1 \text{sgn}(\zeta_1) \tag{69}$$

$$r_2 = -\lambda_2 \text{sgn}(\zeta_2) \tag{70}$$

$$r_3 = -\lambda_3 \text{sgn}(\zeta_3) \tag{71}$$

$$r_4 = -\lambda_4 \text{sgn}(\zeta_4) \tag{72}$$

The update laws for $\lambda_i$ (i=1, 2, 3, 4) are designed as follows:

$$\dot{\varrho}_1 = c_1\left(\frac{\zeta_1^2\Phi_1^T\Phi_1}{2} - \eta_1\varrho_1\right) \tag{73}$$

$$\dot{\varrho}_2 = c_2\left(\frac{\zeta_2^2\Phi_2^T\Phi_2}{2} - \eta_2\varrho_2\right) \tag{74}$$

$$\dot{\varrho}_3 = c_3\left(\frac{\zeta_3^2\Phi_3^T\Phi_3}{2} - \eta_3\varrho_3\right) \tag{75}$$

$$\dot{\varrho}_4 = c_4\left(\frac{\zeta_4^2\Phi_4^T\Phi_4}{2} - \eta_4\varrho_4\right) \tag{76}$$

where $c_i > 0$ (i=1, 2, 3, 4) are learning rates, and $\eta_i > 0$ (i=1, 2, 3, 4) are small constants, Inserting (65)-(68) into the derivative of the Lyapunov function (64), one gets:

$$\dot{W} \le \zeta_1\left(\frac{\dot{\varrho}_1\zeta_1\Phi_1^T\Phi_1}{2} + \varepsilon_1(Z_1) + r_1\right) + \zeta_2\left(\frac{\dot{\varrho}_2\zeta_2\Phi_2^T\Phi_2}{2} + \varepsilon_2(Z_2) + r_2\right) + \tag{77}$$

$$\zeta_3\left(\frac{\dot{\varrho}_3\zeta_3\Phi_3^T\Phi_3}{2} + \varepsilon_3(Z_3) + r_3\right) + \zeta_4\left(\frac{\dot{\varrho}_4\zeta_4\Phi_4^T\Phi_4}{2} + \varepsilon_4(Z_4) + r_4\right) -$$

$$\dot{\varrho}_1\left(\frac{\zeta_1^2\Phi_1^T\Phi_1}{2} - c_1\dot{\varrho}_1\right) - \dot{\varrho}_2\left(\frac{\zeta_2^2\Phi_2^T\Phi_2}{2} - c_2\dot{\varrho}_2\right)$$

Substituting (73)-(76) into (77), leads to the following:

$$\dot{W} \le \zeta_1(\varepsilon_1(Z_1)+r_1)+\zeta_2(\varepsilon_2(Z_2)+r_2)+\zeta_3(\varepsilon_3(Z_3)+r_3)+\zeta_4(\varepsilon_4(Z_4)+r_4)+\eta_1\dot{\varrho}_1\varrho_1+\eta_2\dot{\varrho}_2\varrho_2+\eta_3\dot{\varrho}_3\varrho_3 \tag{78}$$

Substituting (69)-(72) into (78) gives:

$$\dot{W} \le -\lambda_1\zeta_1\text{sgn}(\zeta_1)-\lambda_2\zeta_2\text{sgn}(\zeta_2)-\lambda_3\zeta_3\text{sgn}(\zeta_3)-\lambda_4\zeta_4\text{sgn}(\zeta_4)+\zeta_1\varepsilon_1(Z_1)+\zeta_2\varepsilon_2(Z_2)+\zeta_3\varepsilon_3(Z_3) \tag{79}$$

and then $$\dot{W} \le -\lambda_1|\zeta_1|-\lambda_2|\zeta_2|-\lambda_3|\zeta_3|-\lambda_4|\zeta_4|+|\zeta_1|\bar{\varepsilon}_1+|\zeta_2|\bar{\varepsilon}_2+|\zeta_3|\bar{\varepsilon}_3+|\zeta_4|\bar{\varepsilon}_4 \tag{80}$$

where $|\varepsilon_1(Z_1)| \le \bar{\varepsilon}_1$, $|\varepsilon_2(Z_2)| \le \bar{\varepsilon}_2$, $|\varepsilon_3(Z_3)| \le \bar{\varepsilon}_3$, and $|\varepsilon_4(Z_4)| \le \bar{\varepsilon}_4$, with $\bar{\varepsilon}_i$ (i=1, 2, 3, 4) are positive constants.

Using the Young's inequality leads to:

$$\eta_i\dot{\varrho}_i\varrho_i = \eta_i\dot{\varrho}_i(\varrho_i - \dot{\varrho}_i) = -\eta_i\dot{\varrho}_i^2 + \eta_i\varrho_i\dot{\varrho}_i \le -\frac{\eta_i\dot{\varrho}_i^2}{2} + \frac{\eta_i\varrho_i^2}{2}, (i=1,2,3,4) \tag{81}$$

The term $$\frac{\eta_i(\dot{\varrho}_i^2)^{\frac{1}{2}}}{2} - \frac{\eta_i\dot{\varrho}_i^2}{2} + \frac{\eta_i\varrho_i^2}{2}$$

is bound by:

$$\frac{\eta_i(\dot{\varrho}_i^2)^{\frac{1}{2}}}{2} - \frac{\eta_i\dot{\varrho}_i^2}{2} + \frac{\eta_i\varrho_i^2}{2} \le \frac{\eta_i\dot{\varrho}_i^2}{2} + \frac{\eta_i\rho_i}{8} \tag{82}$$

where $$\frac{\eta_i\dot{\varrho}_i^2}{2} + \frac{\eta_i\rho_i}{8}$$

is the upper bound.
Equation (80) can be rewritten as $$\dot{W} \le -(\lambda_1-\bar{\varepsilon}_1)(|\zeta_1|^2)^{\frac{1}{2}} - (\lambda_2-\bar{\varepsilon}_2)(|\zeta_1|^2)^{\frac{1}{2}} - \tag{83}$$

$$(\lambda_3-\bar{\varepsilon}_3)(|\zeta_1|^2)^{\frac{1}{2}} - (\lambda_4-\bar{\varepsilon}_4)(|\zeta_1|^2)^{\frac{1}{2}} - \frac{\eta_1(\dot{\varrho}_1^2)^{\frac{1}{2}}}{2}$$

The parameters $\lambda_i$ (i=1, 2, 3, 4) are selected such that:

$$(\lambda_1-\bar{\varepsilon}_1) > 0 \tag{84}$$

$$(\lambda_2-\bar{\varepsilon}_2) > 0 \tag{85}$$

$$(\lambda_3-\bar{\varepsilon}_3) > 0 \tag{86}$$

$$(\lambda_4-\bar{\varepsilon}_4) > 0 \tag{87}$$

This section presents simulation results to demonstrate the contribution and effectiveness of the developed control scheme for the FCHEV in the presence of parametric uncertainties, external disturbances, and sensor faults. The ratings of the energy sources, the parameters of the DC-DC converters, and the parameters of the vehicle are provided in Table 1, Table 2, and Table 3. respectively. The controller gains are provided in Table 4. The FCHEV system (65)-(68) under the control laws (65)-(68) with adaptive laws (73)-(76) are simulated on MATLAB/Simulink platform. The initial states of the FCHEV are set as $I_F(0)=0.1$, $I_b(0)=0.1$, $I_{UC}(0)=0.1$, and $V_{dc}(0)=0.1$. The initial conditions of the adaptive rules are set as $\varrho_i(0)=0$, I=1, 2, 3, 4.

Figure 4:
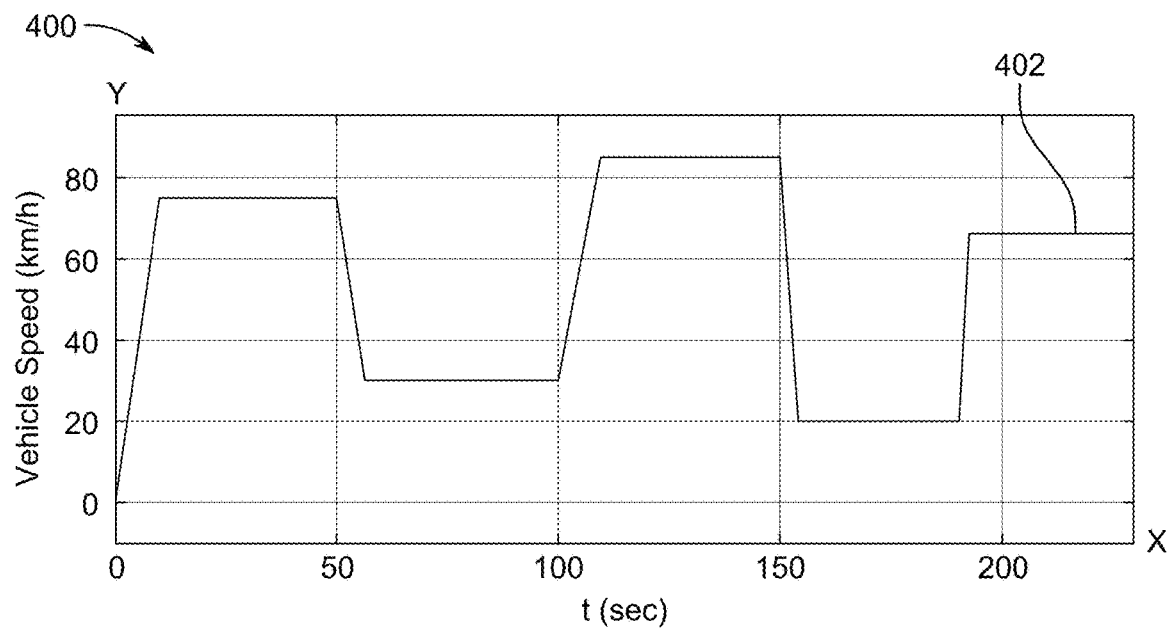
FIG. 4 illustrates an exemplary graph depicting a driving cycle of the FCHEV using the fault-tolerant control system, according to certain embodiments.
Figure 5:
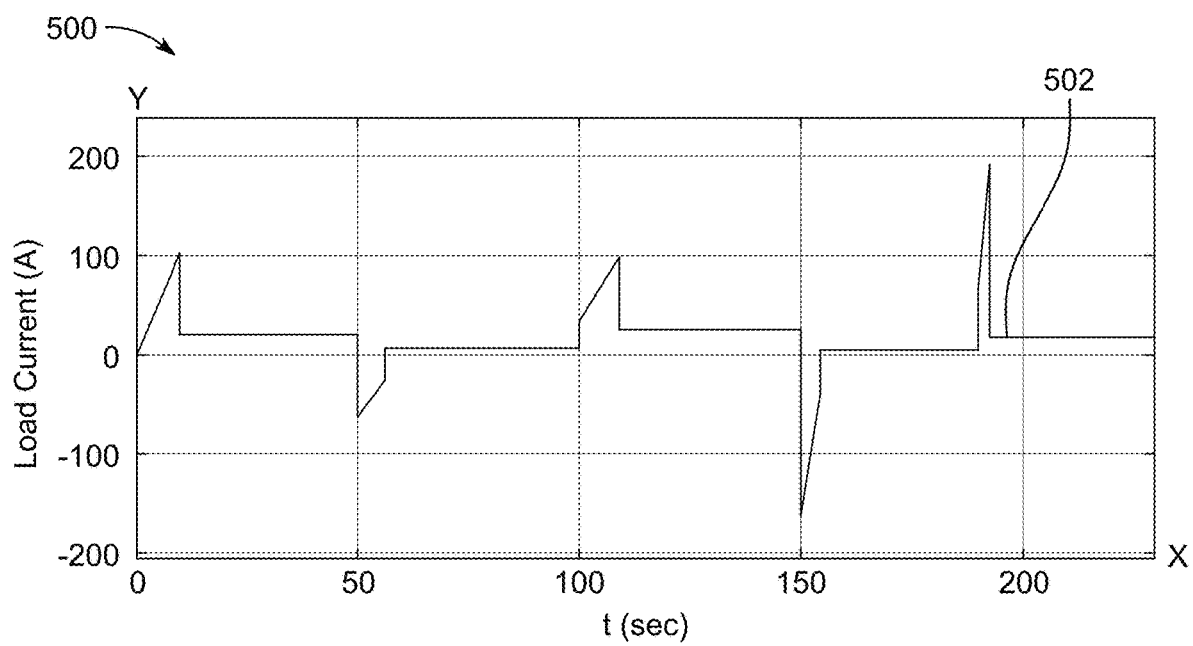
FIG. 5 illustrates an exemplary graph depicting the load current profile of the FCHEV traction motor under the driving cycle conditions using the fault-tolerant control system, according to certain embodiments.

To demonstrate the capability of the developed control method, a driving cycle showing the vehicle's acceleration, deceleration, and constant speed is generated as shown in FIG. 4. The equivalent load current conditions of the FCHEV traction motor are shown in FIG. 5.

TABLE 1

Ratings of the energy sources

| Energy sources | Ratings |
|---|---|
| Battery module | 288 V, 13.90 Ah |
| Fuel cell | 350 V, 250, A, 34 kw |
| ultracapacitor module | 205 V, 2700 F |

TABLE 2

Parameters of the DC-DC converters

| Parameters | Values |
|---|---|
| $L_{FC}$, $L_B$, and $L_{UC}$ | 3.30 mH, 3.30 mH, 3.30 mH |
| $R_{FC}$, $R_B$, and $R_{UC}$ | 20.0 mΩ, 20.0 mΩ, 20.0 mΩ |
| $C_{dc}$ | 1.66 mF |

Let $a_1 = \min\{\sqrt{2}(\lambda_1-\bar{\varepsilon}_1), \sqrt{2}(\lambda_2-\bar{\varepsilon}_2), \sqrt{2}(\lambda_3-\bar{\varepsilon}_3), \sqrt{2}(\lambda_4-\bar{\varepsilon}_4), \frac{\eta_1\sqrt{2c_1}}{2}, \frac{\eta_1\sqrt{2c_1}}{2}, \frac{\eta_1\sqrt{2c_1}}{2}, \frac{\eta_1\sqrt{2c_1}}{2}\}$, and $$a_3 = \sum_{i=1}^{i=4}\left(\frac{\eta_i \dot{\varrho}_i^2}{2} + \frac{\eta_i \rho_i}{8}\right),$$

then becomes $$\dot{W} \leq -a_1 W^{a_2} + a_3 \tag{88}$$

where $$a_2 = \frac{1}{2}$$

According to the definition in Section 2.0.2, the PCHEV system associated with (88) is finite-time stable with convergence time bounded by:

$$T_s \leq \frac{1}{a_1 b W^{1-a_2}(0)} \tag{89}$$

TABLE 3

Parameters of the vehicle.

| Parameters | Values |
|---|---|
| $C_r$, $C_x$, $\lambda_a$ | 0.0048, 0.190, 1.223 kg/m³ |
| g | 9.81 N/kg |
| M, A | 1066 kg, 1.80 m² |

TABLE 4

Parameters and ratings of the FCHEV system.

| Controller gains | Values |
|---|---|
| $\eta_1$, $\eta_2$, $\eta_3$, and $\eta_4$ | 0.01, 0.01, 0.01, and 0.01 |
| $c_1$, $c_2$, $c_3$, and $c_4$ | 0.5, 0.5, 0.5, and 0.5 |
| $\kappa_1$, $\kappa_2$, $\kappa_3$, and $\kappa_4$ | 7, 7, 7, and 8 |
| $\lambda_1$, $\lambda_2$, $\lambda_3$, and $\lambda_4$ | 4, 4, 4, and 2 |
| $\gamma$, $\alpha$ | 0.2, 0.6 |

Referring now to FIG. 4, the present diagram provides an exemplary graph 400 depicting a driving cycle of the FCHEV, according to certain embodiments.

In an embodiment, the driving cycle profile is used to evaluate the performance of the FCHEV using the fault-tolerant control system or the control strategy under varying vehicle operating conditions. As depicted in the graph 400, an X-axis represents time (t) in seconds (sec), and a Y-axis represents the speed of the FCHEV in kilometers per hour (km/h). The driving cycle comprises a combination of acceleration, cruising, and deceleration phases to emulate realistic urban driving behaviour. In the graph 400, a curve 402 represents the speed of the FCHEV. The curve 402 represents realistic dynamic vehicle operation and is used to generate the time-varying load current demand profile applied to the FCHEV during simulation. As depicted in the graph 400, the FCHEV accelerates and reaches its peak speed within the time interval of approximately 100 to 150 seconds, reflecting a high-demand propulsion phase. Subsequently, the FCHEV undergoes deceleration, attaining its minimum speed within the interval of approximately 150 to 200 seconds, simulating a slowdown or braking scenario.

Referring now to FIG. 5, the present diagram provides an exemplary graph 500 depicting load current profile of the FCHEV traction motor under the driving cycle conditions, according to certain embodiments. The graph 500 depicts the corresponding equivalent load current profile drawn by the traction motor over time in response to the driving cycle as shown in FIG. 4. In the graph 500, the X-axis denotes time (t) in seconds (sec), and the Y-axis represents the load current $I_0$ in amperes (A). The current profile exhibits sharp transitions and continuous variations in magnitude, capturing the effect of rapid acceleration and braking phases. In the graph 500 a scurve 502 represents the equivalent load current demand imposed on the FCHEV during the simulated driving cycle. As shown, the load current reaches its maximum magnitude within the time interval of approximately 150 to 200 seconds, corresponding to a high-power requirement scenario, likely due to rapid acceleration or uphill driving. Conversely, the minimum load current is observed at around 150 seconds, representing a transitional state such as vehicle coasting or regenerative braking. This current demand serves as a critical input to the energy management strategy and the fault-tolerant control scheme to validate the system's robustness and dynamic response under practical load fluctuations.

Figure 6A:
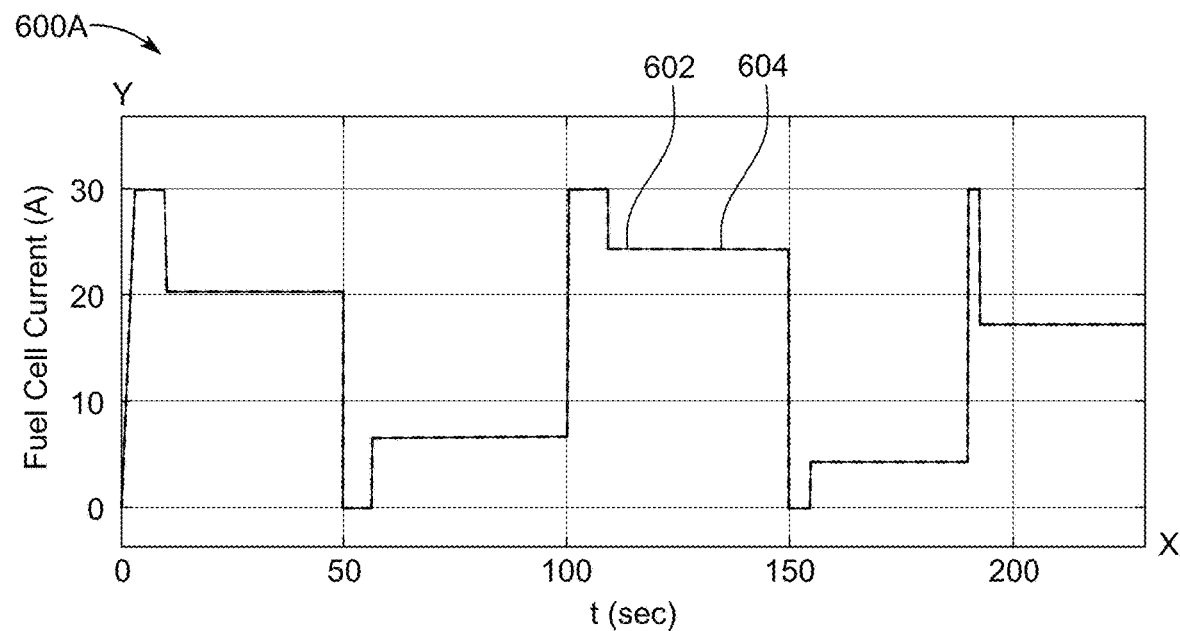
FIG. 6A illustrates an exemplary graph depicting a simulation result of fuel cell current tracking in the FCHEV using the fault-tolerant control system, according to certain embodiments.

Referring now to FIG. 6A, the present diagram provides an exemplary graph 600A depicting the simulation result of the fuel cell current tracking in the FCHEV using the fault-tolerant control system 100. As depicted in the graph 600A the fuel cell current response of the FCHEV system over a simulation time (t) of 0 to 200 seconds. In the graph, the x-axis represents time in seconds (sec), while the y-axis indicates the fuel cell current in amperes (A), ranging from 0 to 30 A. The graph 600A includes two curves: a straight line curve 602 representing the desired fuel cell current $I^*_{FC}$, and a dotted curve 604 representing the actual fuel cell current $I_{FC}$.

As shown in the figure, the actual current $I_{FC}$ closely tracks the desired trajectory $I^*_{FC}$ throughout the simulation period. The minimal tracking error demonstrates the effectiveness of the finite-time fractional-order sliding mode control scheme. The transient response remains stable, and the tracking convergence occurs within a short period, confirming the finite-time convergence characteristic of the controller. In this case, the FCHEV is simulated without considering the parametric uncertainties and sensor faults. The graph 600A show that the energy sources are supplying the currents to the load according to the energy management strategy. It can be seen that the fuel cell supplies the current to the load during constant vehicle speed, but during acceleration, it only contributes a fraction of the load current demand to avoid degradation. The present disclosure preferably provides finite time stability to improve convergence rate, tracking accuracy and robustness.

Figure 6B:
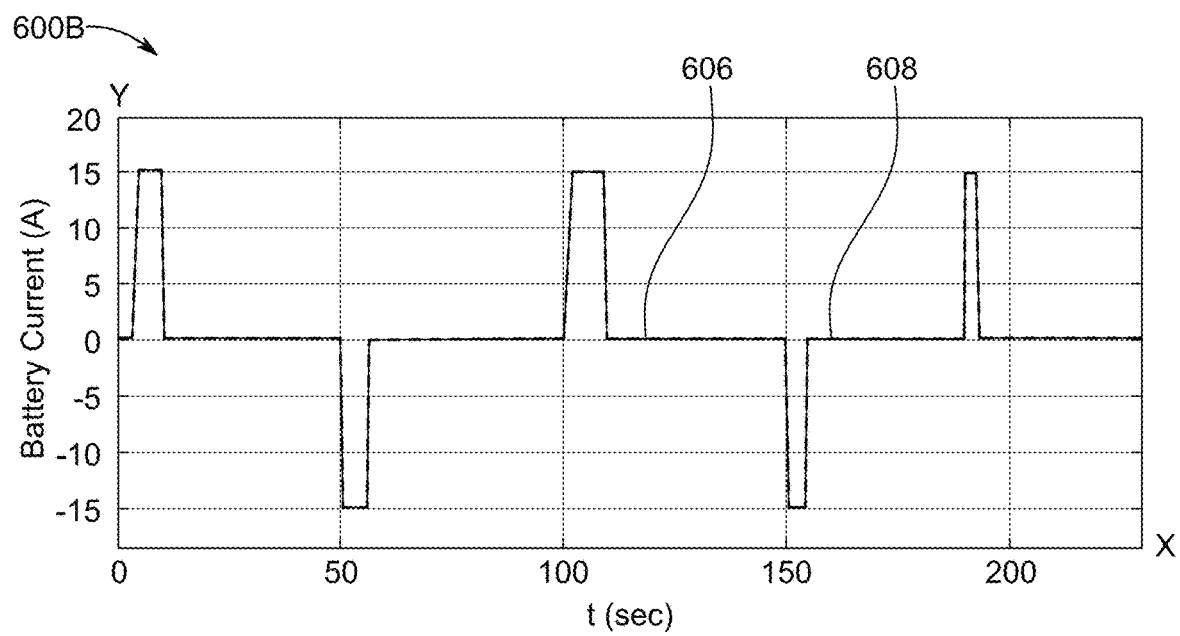
FIG. 6B illustrates an exemplary graph depicting the simulation result for battery current tracking in the FCHEV using the fault-tolerant control system, according to certain embodiments.

Referring now to FIG. 6B, the present diagram provides an exemplary graph 600A depicting the simulation result of the battery current tracking in the FCHEV using the fault-tolerant control system 100. As depicted in the graph 600B the battery current response of the FCHEV over a simulation time (t). In the graph, the x-axis represents time (0-200 sec), and the y-axis represents battery current in amperes (A), constrained between −15 A and 15 A. The straight line curve 606 shows the desired battery current $I^*_b$, and the dotted curve shows the actual battery current $I_b$. During acceleration phases, the battery discharges (positive current) to assist the fuel cell, while during deceleration, it charges (negative current) by recovering regenerative braking energy. The current remains within the defined bounds, thus preventing overcharging or deep discharging, as per the energy management policy.

As shown in the graph 600A, the actual battery current $I_b$ closely tracks the desired trajectory $I^*_b$ throughout the simulation period. The minimal tracking error demonstrates the effectiveness of the finite-time fractional-order sliding mode control schemes. The transient response remains stable, and the tracking convergence occurs within a short period, confirming the finite-time convergence characteristic of the controller. In this case, the FCHEV is simulated without considering the parametric uncertainties and sensor faults.

Figure 6C:
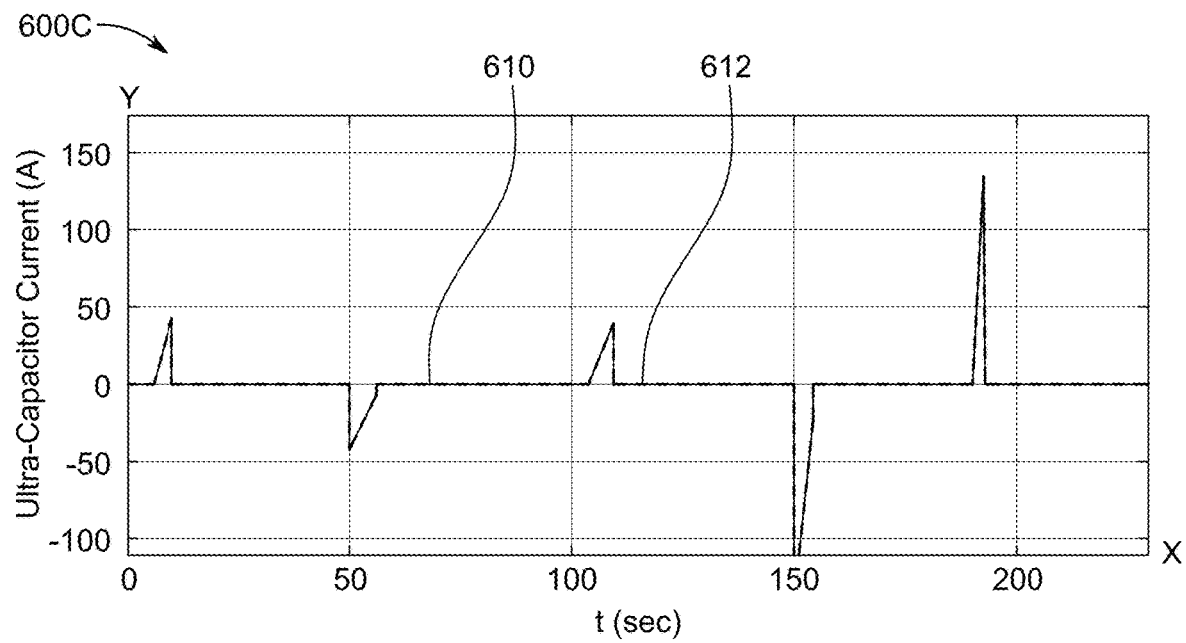
FIG. 6C illustrates an exemplary graph depicting the simulation result for ultracapacitor current tracking in the FCHEV using the fault tolerant control system, according to certain embodiments.

Referring now to FIG. 6C, the present diagram provides an exemplary graph 600C depicting the simulation result of the ultracapacitor current tracking in the FCHEV using the fault-tolerant control system 100. As illustrated in the graph 600C, the ultracapacitor current response of the FCHEV is shown over the simulation time (t). The x-axis represents time (0-200 sec), and the y-axis represents ultracapacitor current in amperes (A). The straight line curve 610 shows the desired ultracapacitor current $I^*_{UC}$, and the dotted curve 612 shows the actual ultracapacitor current $I_{UC}$.

The ultracapacitor is responsible for handling the peak power demands due to its high power density and fast response characteristics. During sudden acceleration, the ultracapacitor supplies current to supplement the battery and fuel cell. Conversely, during rapid deceleration or regenerative braking, it absorbs excess energy not accommodated by the battery.

As depicted in the graph 600C, the actual current $I_{UC}$ accurate tracking performance with minimal deviation from the desired trajectory $I^*_{UC}$. throughout the entire simulation period. This confirms that the finite-time fractional-order sliding mode control effectively manages fast dynamics and transient power demands. The short settling time and tight convergence further validate the robustness and responsiveness of the controller under nominal operating conditions, i.e., without parametric uncertainties and sensor faults.

Figure 6D:
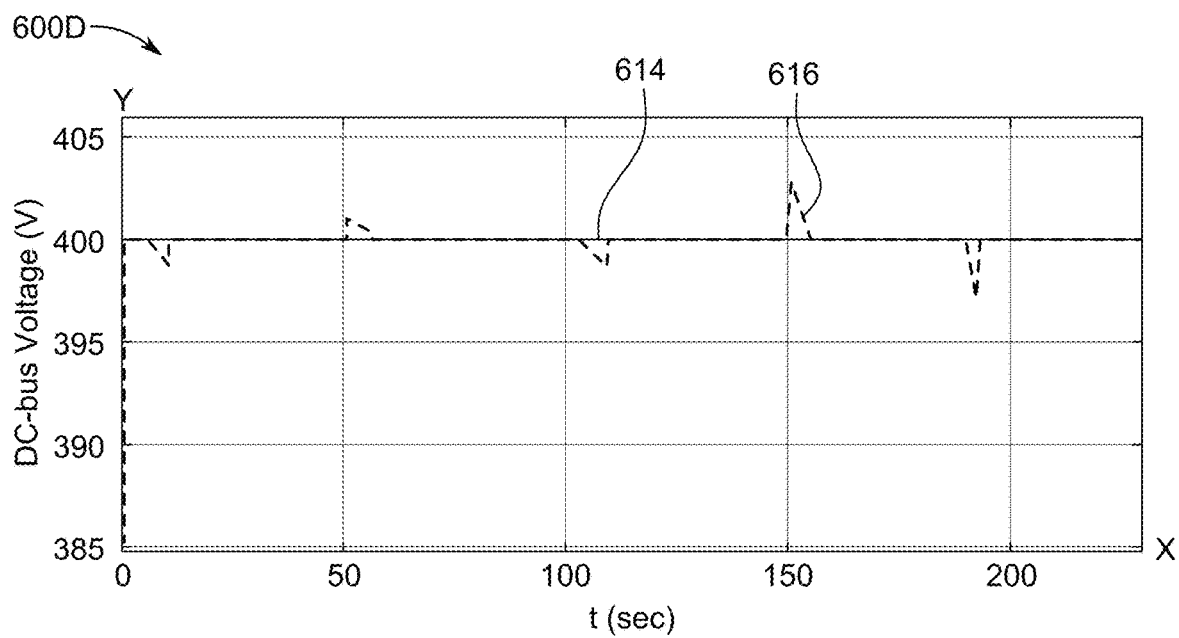
FIG. 6D illustrates an exemplary graph depicting the simulation result of the response of the DC-link voltage during the driving cycle in the FCHEV using the fault tolerant control system, according to certain embodiments.

Referring now to FIG. 6D, the present diagram provides an exemplary graph 600D illustrating the simulation result of DC-link voltage regulation in the FCHEV using the fault-tolerant control system 100. In the graph 600D, the x-axis represents time (0-200 sec), and the y-axis represents the DC-link voltage $V_{dc}$ in volts (V). The straight line curve 614 denotes the desired DC-link voltage $V^*_{dc}$, and the dotted curve 616 shows the actual voltage $V_{dc}$ across the DC bus.

The DC-link voltage is a critical parameter for maintaining stable power flow and ensuring coordinated energy exchange among the fuel cell, battery, and ultracapacitor. Voltage deviations, if unregulated, may affect the performance of downstream power electronics and load operation.

As shown in graph 600D, the actual DC-link voltage $V_{dc}$ effectively tracks the reference voltage $V^*_{dc}$, exhibiting minimal overshoot and undershoot even during dynamic driving conditions such as acceleration and deceleration. The transient fluctuations are efficiently mitigated by the fractional-order control strategy, leading to stable and robust voltage regulation. The simulation confirms that the control law provides finite-time convergence and maintains the voltage within the desired threshold in the absence of sensor faults and parametric uncertainties.

Figure 7D:
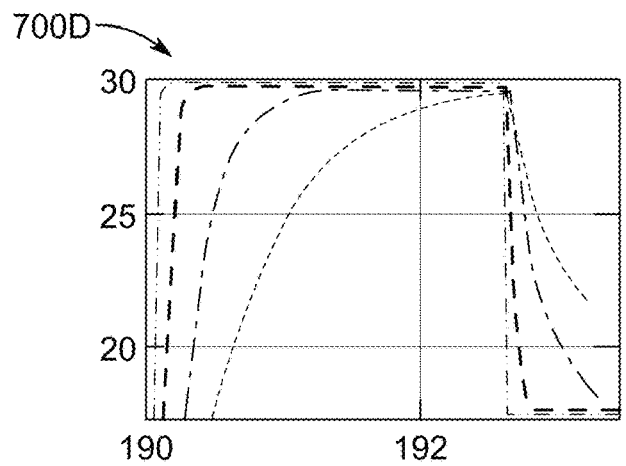
FIG. 7D illustrates an exemplary graph depicting the simulated comparison of DC bus voltage tracking between the fault-tolerant controller and existing controller when the FCHEV is simulated, according to certain embodiments.
Figure 7E:
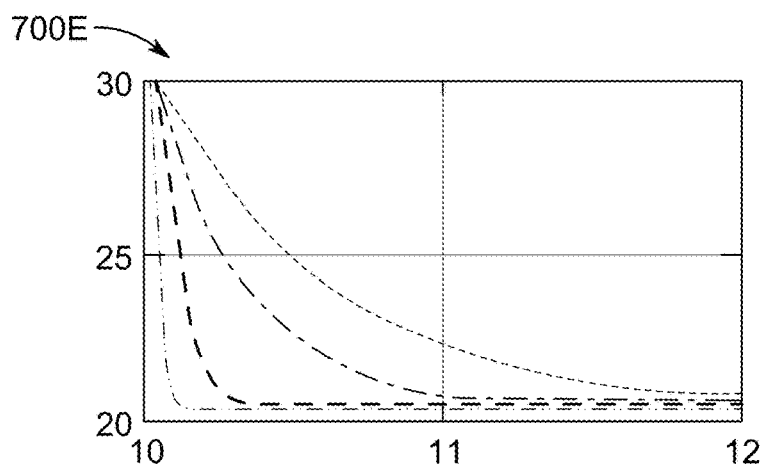
FIG. 7E illustrates a portion of the curve of FIG. 7A at signal transitions.
Figure 7F:
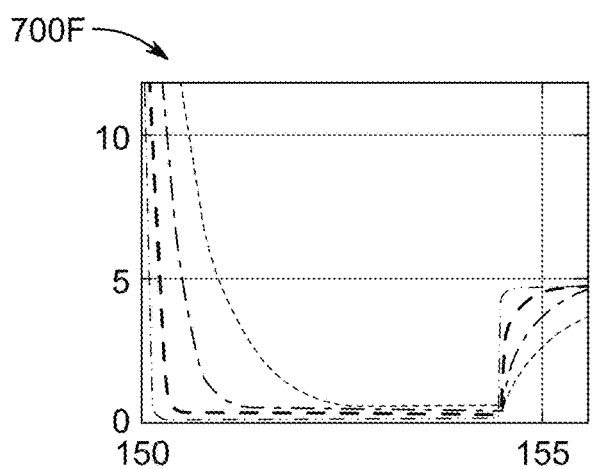
FIG. 7F illustrates a portion of the curve of FIG. 7A at signal transitions.
Figure 7J:
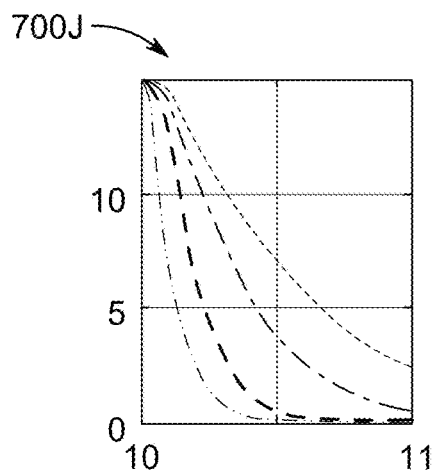
FIG. 7J illustrates a portion of the curve of FIG. 7G.
Figure 7K:
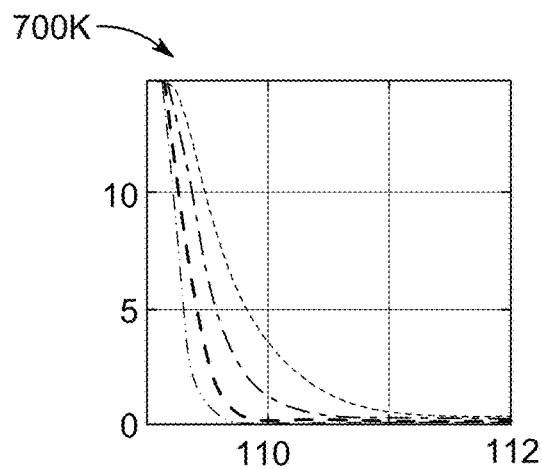
FIG. 7K illustrates a portion of the curve of FIG. 7G.
Figure 7L:
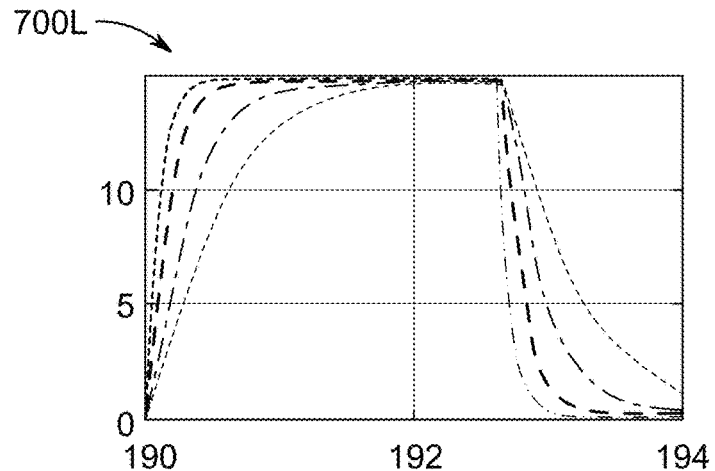
FIG. 7L illustrates a portion of the curve of FIG. 7G.
Figure 7P:
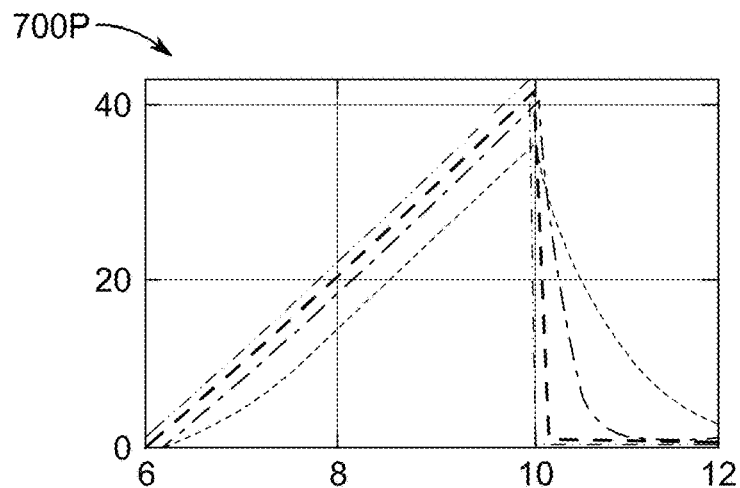
FIG. 7P illustrates a portion of the curve of FIG. 7M.
Figure 7Q:
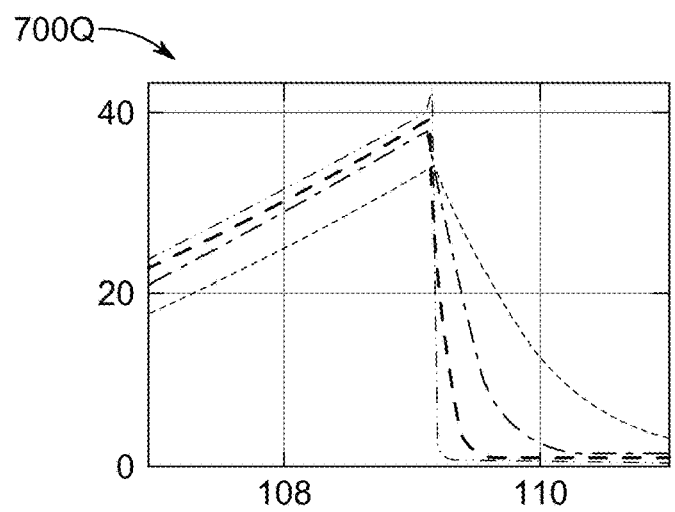
FIG. 7Q illustrates a portion of the curve of FIG. 7M.
Figure 7R:
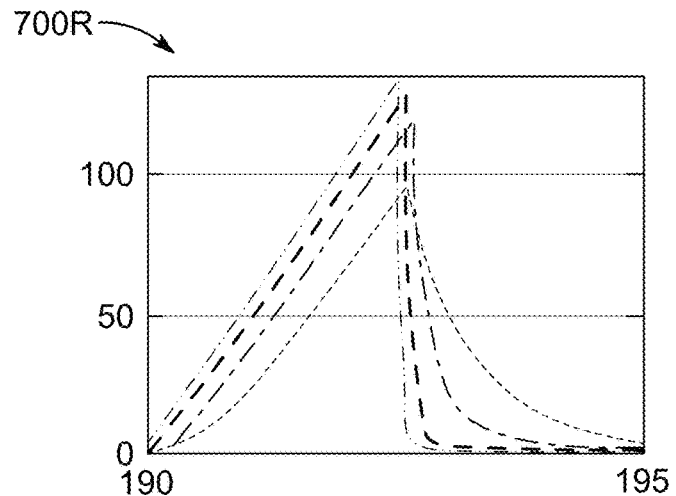
FIG. 7R illustrates a portion of the curve of FIG. 7M.

Referring now to FIG. 7A, the present diagram provides an exemplary graph 700A depicting the simulation result of a comparison between the fault-tolerant controller and the existing controllers for fuel cell current tracking, according to certain embodiments. In this case, the FCHEV is simulated with parametric uncertainties of ±40% without sensor faults. Moreover, the performance of the fault-tolerant controller under this condition is compared with the existing controllers, such as backstepping (BC) and double integral sliding mode control (DISMC), developed for FCHEV. The x-axis represents simulation time (0-200 sec), and the y-axis represents fuel cell current in amperes (A). The desired fuel cell current $I_{FC}$ is represented as solid straight line curve 702. The graph 700A includes the tracking response under three different control schemes: the fault-tolerant controller (small dashed line curve 704), the backstepping controller (dashed curve 706), and the double-integral sliding mode controller (DISMC, dotted curve 708).

As observed in graph 700A, the fault-tolerant controller demonstrates superior performance in accurately tracking the desired fuel cell current with minimal overshoot and faster convergence. In contrast, the DISMC and BC show relatively larger deviations and slower transient responses. This is because the fault-tolerant controller can learn the uncertainties online and compensate for them through the finite-time fractional-order controller, which enhances the convergence speed and tracking accuracy of the system. The FIG. 7B-FIG. 7F, are portions of the curves of FIG. 7A at signal transitions.

Referring now to FIG. 7G, the present diagram provides an exemplary graph 700G illustrating the simulation result of battery current tracking under parametric uncertainties. The x-axis denotes time (0-200 sec), and the y-axis represents battery current (A), ranging between −20 A and 20 A. The desired battery current is represented as solid straight line curve 710. Similar to FIG. 7A, the performance of three control methods is compared: the fault-tolerant controller 704, the backstepping controller 706, and the DISMC 708.

Graph 700G shows that the battery current $I_b$ under the fault-tolerant controller closely follows the desired trajectory $I^*_b$, maintaining the current within the safe operational bounds. In contrast, the BC 706 and DISMC 708 exhibit relatively larger tracking errors, especially during dynamic transitions such as acceleration and deceleration. The finite-time convergence and higher accuracy of the proposed controller ensure effective energy distribution while preventing battery overcharging or deep discharging. FIG. 7H-FIG. 7L, are portions of FIG. 7G.

Referring now to FIG. 7M, the present diagram provides an exemplary graph 700M presenting the comparison of ultracapacitor current tracking performance under parametric uncertainties. The x-axis represents time (0-200 sec), and the y-axis denotes ultracapacitor current (A). The graph compares the dynamic tracking performance of the ultracapacitor current using the fault-tolerant controller 704, the BC 706, and the DISMC 708.

As illustrated, the control scheme maintains closer adherence of the ultracapacitor current $I_{UC}$ to the desired trajectory $I^*_{UC}$, even in the presence of ±40% variations in system parameters. The high power density of the ultracapacitor is effectively harnessed to address load transients, while the other controllers exhibit comparatively slower convergence and greater steady-state error. This validates the effectiveness of the fractional-order control surface in rapidly stabilizing fast dynamic states under model uncertainty. FIG. 7N-FIG. 7R, are expanded portions of FIG. 7M.

Figure 7V:
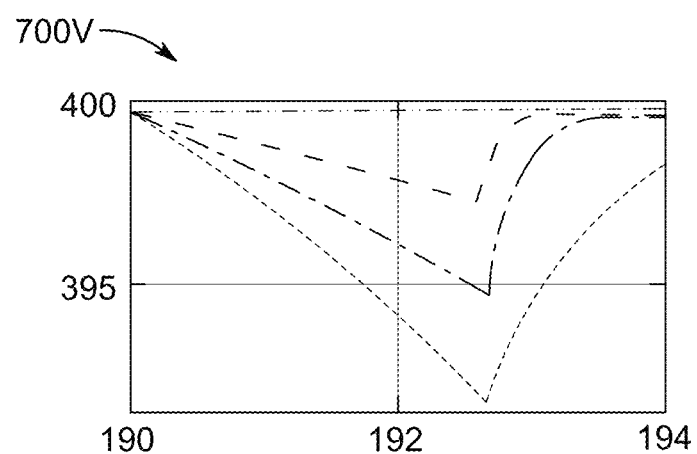
FIG. 7V illustrates a portion of the curve of FIG. 7S.

Referring now to FIG. 7S, the present diagram provides an exemplary graph 700D showing the comparison of DC-link voltage regulation between the fault-tolerant controller and existing controllers under parametric uncertainties. The x-axis spans 0-200 sec, and the y-axis denotes the DC-bus voltage $V_{dc}$. The graph 700S includes the voltage tracking profiles for the fault-tolerant controller, DISMC, and back-stepping controller. FIG. 7T-FIG. 7V, are portions of FIG. 7S.

As depicted in the graph 700S, all controllers experience voltage deviations during acceleration and deceleration. However, the fault-tolerant controller successfully limits the voltage fluctuation to a significantly lower range compared to the other two methods. The reduced overshoot and undershoot are evidence of the proposed controller's enhanced robustness and finite-time stability characteristics. The adaptive fault-tolerant mechanism learns the impact of parametric uncertainties in real-time and adjusts control actions to maintain voltage stability, ensuring power quality and system safety.

Figure 8A:
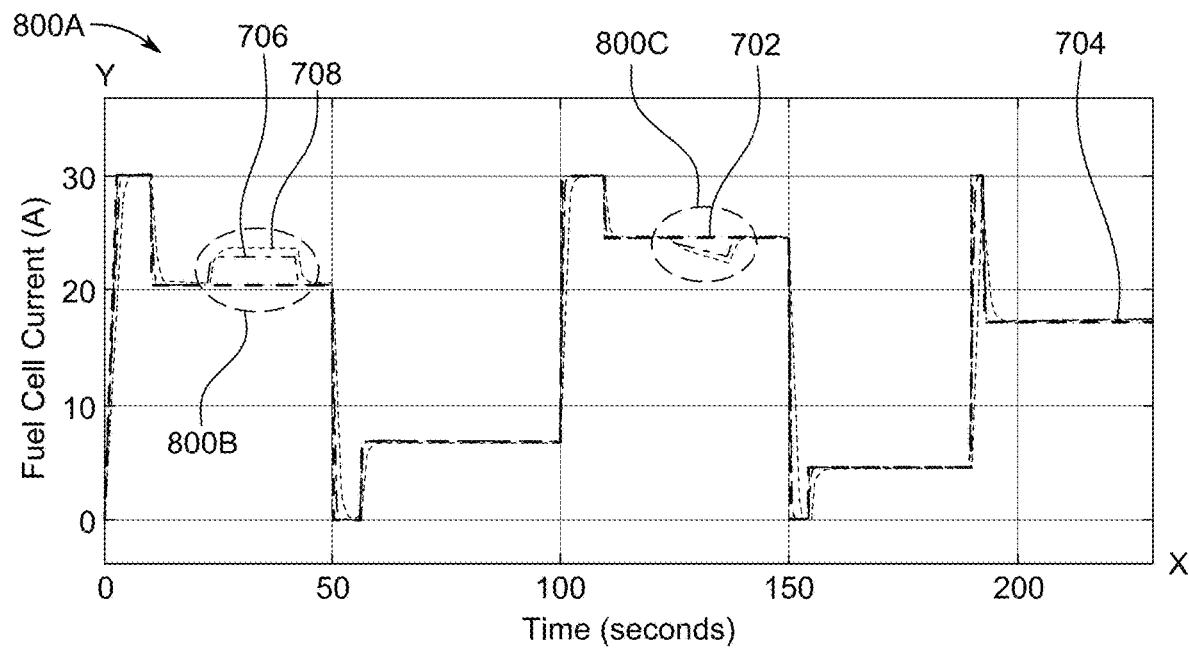
FIG. 8A illustrates an exemplary graph depicting the simulation result of comparison between the fault-tolerant controller and existing controller for fuel cell current tracking when the FCHEV is simulated considering parametric uncertainties and sensor faults, according to certain embodiments.

Referring now to FIG. 8A, the present diagram provides an exemplary graph 800A illustrating the simulation result of fuel cell current tracking in the FCHEV under combined parametric uncertainties and sensor faults. The x-axis represents time (0-200 sec), and the y-axis denotes fuel cell current in amperes (A). The graph compares the tracking performance of the fault-tolerant controller 704 (small, dashed curve) with existing controllers BC 704 (dashed curve) and double integral sliding mode controller (DISMC, dotted curve).

Figure 8B:
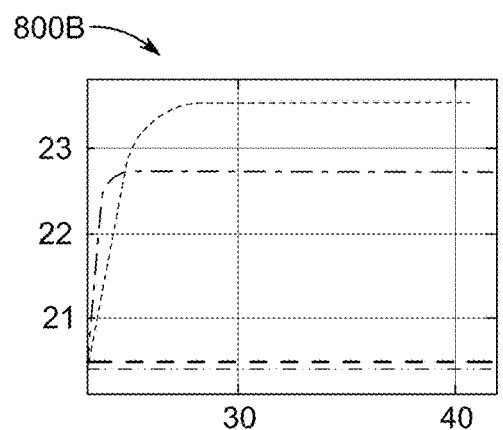
FIG. 8B illustrates an exemplary graph depicting the simulation result of comparison between the fault-tolerant controller and existing controller for battery current tracking when the FCHEV is simulated considering parametric uncertainties and sensor faults, according to certain embodiments.
Figure 8C:
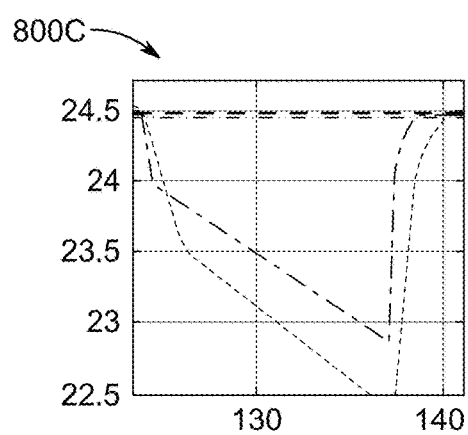
FIG. 8C illustrates an exemplary graph depicting the simulation result comparison between the fault-tolerant controller and existing controller for ultracapacitor current tracking when the FCHEV is simulated considering parametric uncertainties and sensor faults, according to certain embodiments.

As shown in graph 800A, the controller demonstrates robust tracking of the desired fuel cell current despite the presence of sensor faults and ±40% parametric uncertainties. The deviations caused by sensor faults are effectively compensated in finite time due to the integration of a fractional-order sliding mode surface and the adaptive RBFNN estimator. In contrast, BC and DISMC fail to compensate for the sensor faults, leading to large tracking errors and instability in current response during the fault-active durations. FIG. 8B-FIG. 8C, are portions of FIG. 8A.

Referring now to FIG. 8D, the present diagram provides an exemplary graph 800D illustrating the battery current tracking in the FCHEV under the simultaneous effect of sensor faults and parametric uncertainties. The x-axis covers simulation time (0-200 sec), and the y-axis represents battery current (A), bounded between −20 A and 20 A. The tracking results for the proposed controller, BC, and DISMC are shown.

Figure 8G:
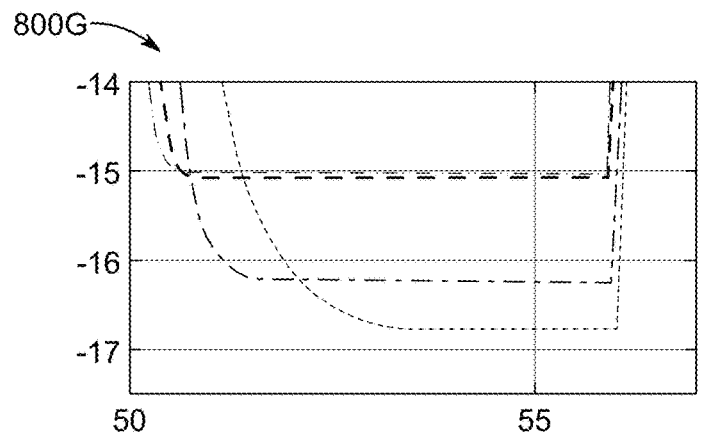
FIG. 8G illustrates a portion of the curve of FIG. 8D.

Graph 800D shows that the proposed fault-tolerant controller maintains the battery current $I_b$ closely aligned with the desired trajectory $I^*_b$, even during fault periods. The RBFNN detects and estimates bias, drift, and loss-of-effectiveness faults in sensor readings, and the control law compensates in real-time using the estimated values. This leads to significantly reduced tracking error and bounded current within the safety limits, as required by the energy management strategy. In contrast, BC 706 and DISMC 708 exhibit poor performance with unstable responses and large deviations during fault intervals, indicating their inability to handle sensor degradations effectively. FIG. 8E-FIG. 8G, are portions of FIG. 8D.

Figure 8H:
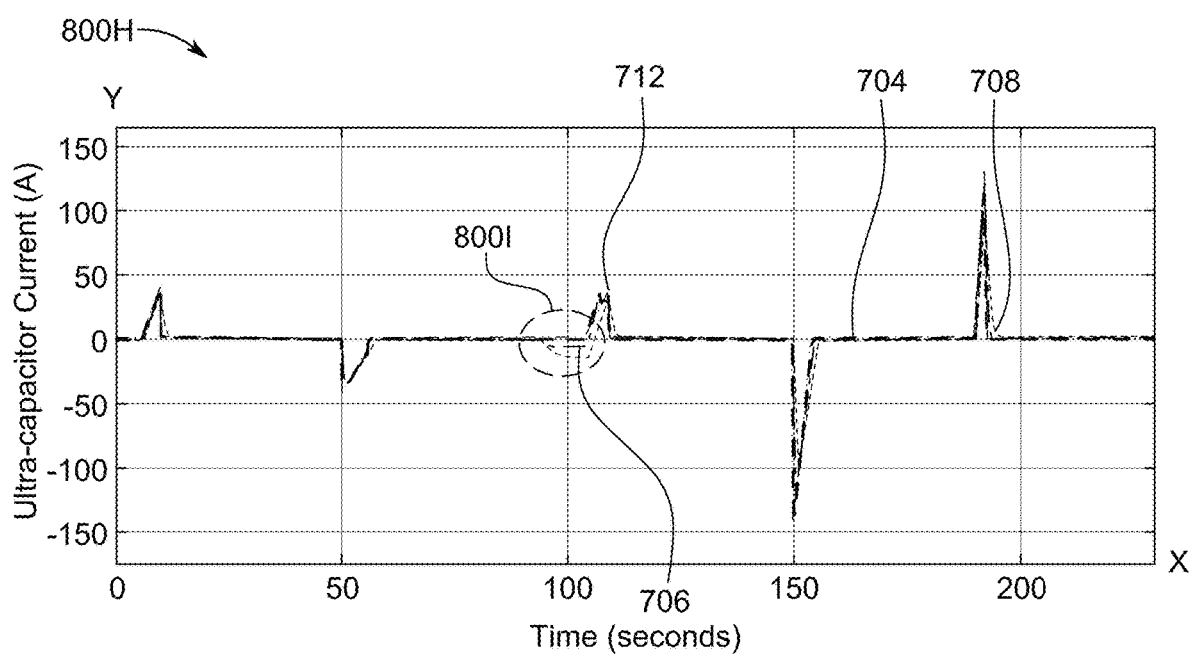
FIG. 8H illustrates an exemplary graph showing a ultracapacitor current tracking performance of the FCHEV in the presence of both parametric uncertainties and sensor faults.
Figure 8I:
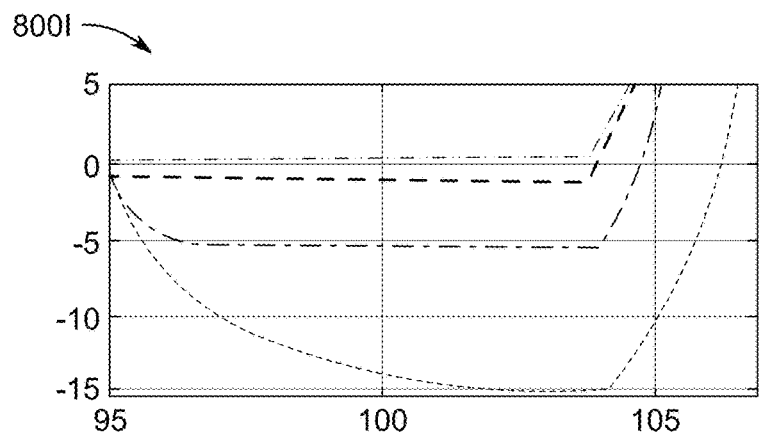
FIG. 8I illustrates a portion of the curve of FIG. 8H.

Referring now to FIG. 8H, the present diagram presents an exemplary graph 800C showing the ultracapacitor current tracking performance of the FCHEV in the presence of both parametric uncertainties and sensor faults. The x-axis represents time (0-200 sec), while the y-axis represents the ultracapacitor current (A). The graph illustrates the response curves under the proposed controller, BC, and DISMC.

As depicted in the graph 800H, the fault-tolerant controller 704 provides a rapid and accurate response of the ultracapacitor current, even under compounded fault conditions. The ultracapacitor effectively handles peak transients, such as acceleration and regenerative braking, while the controller quickly compensates for any errors introduced by faulty sensor readings.

Figure 8J:
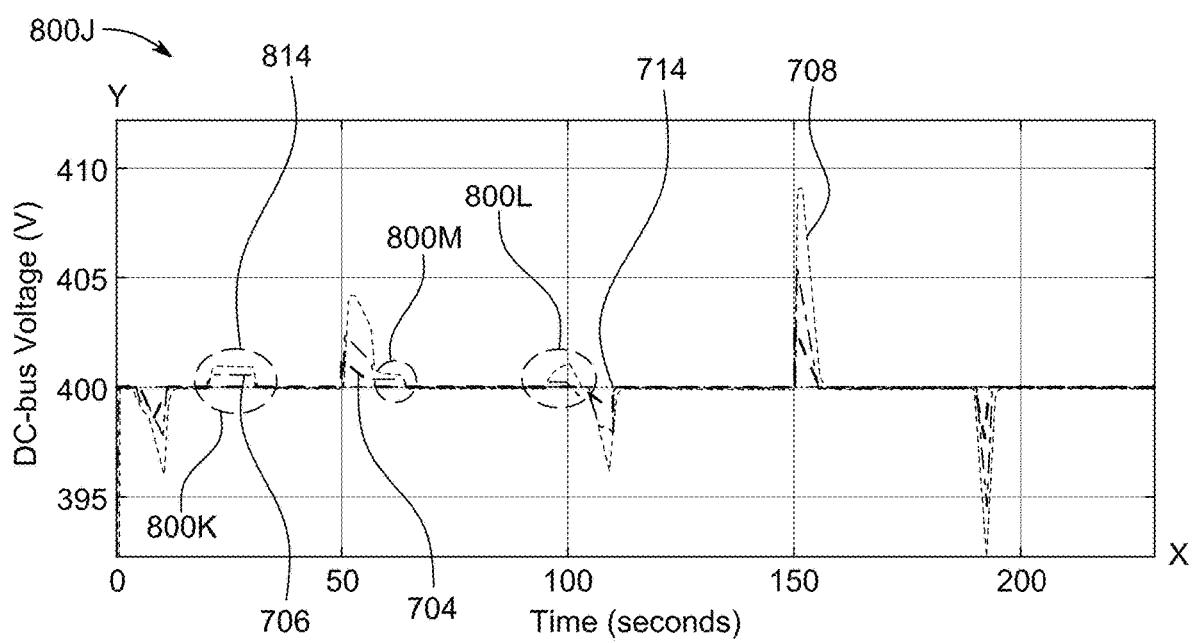
FIG. 8J illustrates an exemplary graph depicting the DC-link voltage regulation performance under simultaneous sensor faults and parametric uncertainties.

Meanwhile, the BC 706 and DISMC 708 controllers demonstrate significant mismatches with the desired trajectory, due to their lack of adaptive estimation for sensor-related disturbances. The superior dynamic performance of the proposed controller highlights its high responsiveness and precision in fast-changing load conditions. FIG. 8J, is portions of FIG. 8H.

Figure 8K:
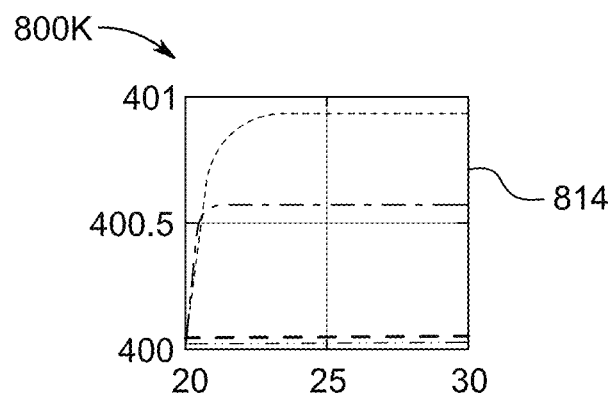
FIG. 8K illustrates a portion of the curve of FIG. 8J.
Figure 8L:
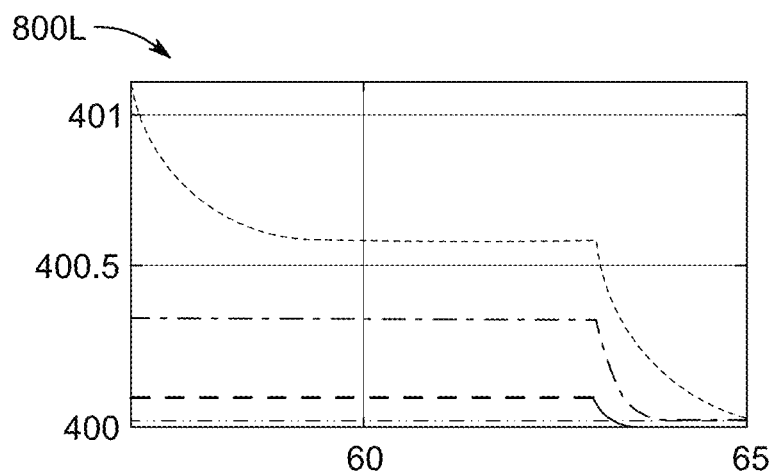
FIG. 8L illustrates a portion of the curve of FIG. 8J.
Figure 8M:
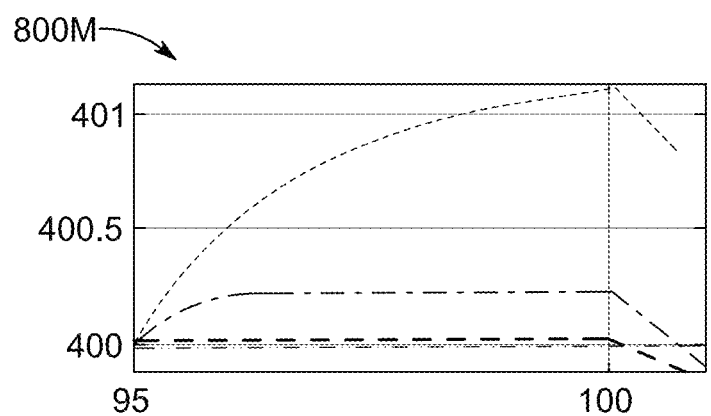
FIG. 8M illustrates a portion of the curve of FIG. 8J.

Referring now to FIG. 8J, the present diagram provides an exemplary graph 800D depicting the DC-link voltage regulation performance under simultaneous sensor faults and parametric uncertainties. The x-axis spans 0-200 sec, and the y-axis shows DC-bus voltage. FIG. 8K-FIG. 8M, are portions of FIG. 8J.

As shown in graph 800D, during sensor fault occurrences, the DC-link voltage under BC and DISMC controllers deviates significantly from the desired level, resulting in oscillations and poor voltage stability. These deviations stem from the inaccurate current measurements fed to the converters, which the conventional controllers are unable to correct. On the other hand, the proposed fault-tolerant control scheme successfully mitigates the voltage fluctuations by compensating for both the sensor faults and parameter deviations in real time. The voltage profile under the proposed controller shows minimal deviation and fast convergence back to the desired voltage level, confirming the efficacy of the combined RBFNN and fractional-order sliding mode framework.

Figure 9:
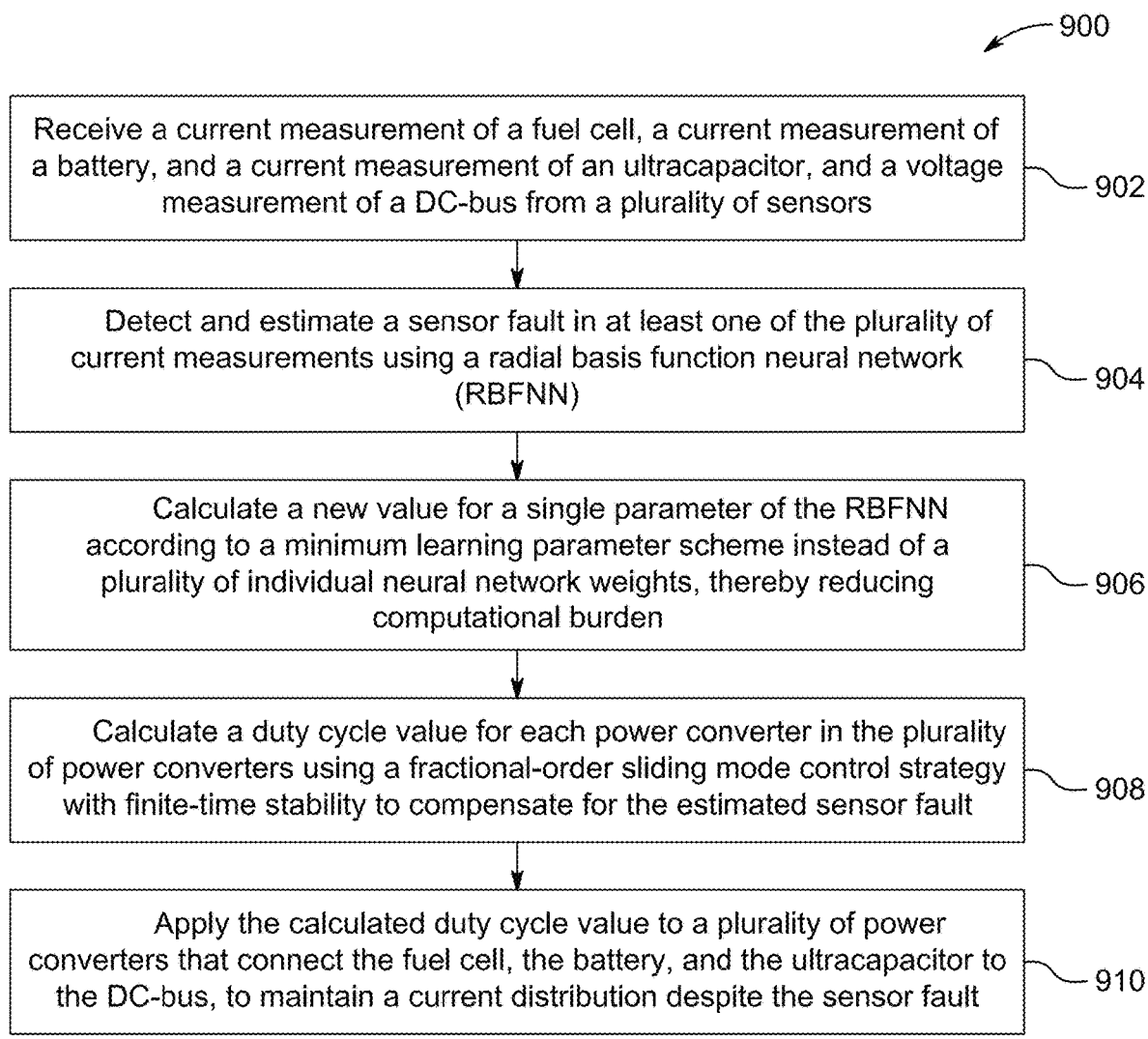
FIG. 9 illustrates an exemplary diagram of a method for controlling the FCHEV with sensor fault tolerance, according to certain embodiments.

Referring now to FIG. 9, the present diagram provides an exemplary diagram of a method 900 for controlling the FCHEV with sensor fault tolerance, according to certain embodiments. In an embodiment, the FCHEV is an electric vehicle that is designed to drive using electric power generated from multiple sources. In the real world, the FCHEV is vulnerable to sensor faults and parametric uncertainties that can disrupt critical inputs for maintaining optimal power distribution and vehicle performance.

In an embodiment, in order to control the FCHEV with the sensor fault and the parametric uncertainties, initially at step 902, a current measurement of a fuel cell, a current measurement of a battery, and a current measurement of an ultracapacitor, and a voltage measurement of a DC-bus is received from a plurality of sensors. The plurality of sensors may include, but are not limited to, a shunt sensor and a hall-effect current sensor. In an embodiment, the fuel cell generates electrical power through an electrochemical reaction of hydrogen gas and oxygen, the battery is charging and discharging depending on the driving condition of the FCHEV, and the ultracapacitor is an energy storage device and can charge or discharge depending on the driving conditions. The ultracapacitor may charge or discharge large amounts of power within a very short period due to its high power density. In an example, $I_{FC}$ is the current measurement of the fuel cell, $I_b$ is the current measurement of the battery, and $I_{UC}$ is the current measurement of the ultracapacitor. Further, $V_{dc}$ is the voltage measurement of the DC-bus link.

In an embodiment, a load current demand is distributed between the fuel cell, the battery, and the ultracapacitor according to an energy management strategy. The energy management scheme is needed to coordinate the energy sources to provide the required electric power to a traction motor for all driving conditions. In an example, the desired current of each energy source is calculated by distributing the load current among them as follows:

$$I^*_b + I^*_{FC} + I^*_{UC} = I_o \quad ( )$$

where $I^*_{FC}$, $I^*_b$, and $I^*_{UC}$ are the desired currents of the fuel cell, battery, and ultracapacitor, respectively. The desired currents $I^*_{FC}$, $I^*_b$ are calculated using the filter-based strategy.

In an embodiment, the energy management strategy includes restricting the fuel cell current below a current threshold level to prevent fuel cell degradation. In an example, the fuel cell cannot supply current beyond 30 A to prevent its degradation. Further, the energy management strategy includes maintaining the battery current between a lower current threshold level and an upper current threshold level. In an example, the battery cannot supply a current of $I^*_b > 15A$ to preserve its health and lifespan. In an embodiment, the energy management strategy includes calculating the ultracapacitor current as a difference between the load current and a sum of the fuel cell current and the battery current. The ultracapacitor receives charging current during vehicle deceleration when the battery current reaches the lower current threshold level.

In an embodiment, at step 904, a sensor fault in at least one of the plurality of current measurements is detected and estimated using a radial basis function neural network (RBFNN). The sensor fault is the deviation that compromises the accuracy and reliability of the measurements and model parameters in the FCHEV. The deviation may degrade control performance and stability of the FCHEV if they are not properly handled. The detection and estimation of the sensor fault includes identifying at least one fault type selected from a group consisting of: a bias fault, a drift fault, a loss of accuracy fault and a loss of effectiveness fault. The bias fault refers to a constant offset or error in the sensor reading, causing the measurements to be consistently higher or lower than the true value. The drift fault is characterized by a gradually increasing or decreasing error over time, leading to progressive inaccuracy. The loss of accuracy fault involves sporadic or irregular deviations that reduce the precision of sensor data without a constant offset. The loss of effectiveness fault occurs when the sensor output becomes weak or partially unresponsive, providing diminished or incomplete data.

In an embodiment, the RBFNN is a type of artificial neural network that uses radial basis functions as activation functions. The RBFNN is particularly effective for function approximation, pattern recognition, and fault detection because it can model complex nonlinear relationships between inputs and outputs. The RBFNN may include an input layer, a hidden layer with radial basis neurons, and an output layer. The network learns to approximate sensor behavior by training on normal operational data, enabling it to detect deviations that indicate the sensor fault. In an example, desired current measurements for the fuel cell ($I^*_{FC}$), the battery ($I^*_b$), the ultracapacitor ($I^*_{UC}$) and the desired voltage measurement ($V^*_{dc}$) of the DC-bus link may be fed into the RBFNN to train it for the normal behavior of the plurality of sensors under fault-free conditions. During the vehicle operation, the current measurements (e.g., $I_{FC}$, $I_b$, $I_{UC}$) and the voltage measurement (e.g., $I_{dc}$) are fed into the RBFNN, which estimates the sensor outputs. By comparing the desired current measurements and the desired voltage measurements, the RBFNN detects and estimates the deviations in measurements, indicating sensor faults have been identified. These deviations represent discrepancies caused by the plurality of sensors malfunctions or inaccuracies.

At step 906, a new value for a single parameter of the RBFNN is calculated according to a minimum learning parameter scheme instead of a plurality of individual neural network weights, thereby reducing computational burden. The minimum learning parameter scheme calculates the single parameter according to a formula as shown:

$$\hat{\varrho}_i = c_i((\zeta_i^2 \phi_i^T \phi_i)/2 - \eta_i \hat{\varrho}_i)$$

where $c_i$ is a learning rate, $\eta_i$ is a positive constant, $\zeta_i$ is a fractional-order sliding mode surface, $\phi_i$ is a Gaussian function vector, and $\hat{\varrho}_i$ is the estimated parameter.

At step 908, a duty cycle value is calculated for each power converter in a plurality of power converters using a fractional-order sliding mode control strategy with finite-time stability to compensate for the estimated sensor fault. The fractional-order sliding mode control strategy uses a fractional-order sliding mode surface and a fault-tolerant control law. The fault-tolerant control law is based on a Lyapunov stability analysis as shown in equation.

$$W = \frac{1}{2}\zeta_1^2 + \frac{1}{2}\zeta_2^2 + \frac{1}{2}\zeta_3^2 + \frac{1}{2}\zeta_4^2 + \frac{1}{2c_1}\tilde{\varrho}_i^2 \qquad (\,)$$

where $c_i > 0$ (i=1, 2, 3, 4) is a design parameter, $\tilde{\varrho}_i = \varrho_i - \hat{\varrho}_i$ (i=1, 2, 3, 4) is the weight estimation error, with $\hat{\varrho}_i$ being the estimate of $\varrho_i$.

Further, the fractional-order sliding mode surface is defined as shown in equation ( )

$$\zeta_i = e_i + \kappa_i \mathcal{D}^{\gamma-1}(\text{sgn}^\alpha(e_i))$$

where $e_i$ is a tracking error variable, $\kappa_i$ is a constant coefficient, $\gamma$ is a fractional order, $\alpha$ is a power exponent, sgn is the sign function, and i represents an index for the fuel cell, battery, ultracapacitor, and DC-bus voltage In an embodiment, the fractional-order sliding mode control strategy with finite-time stability facilitates the continuous supply of power to the load, ensures that the currents of the battery, the fuel cell, and the ultracapacitor are tracking their respective reference values, and stabilizes the DC-bus voltage in finite time.

In an embodiment, the RBFNN estimates the sensor fault and a parametric uncertainty as a combined term. The parametric uncertainties refer to unknown or varying system parameters within a control model that deviate from their nominal or expected values due to modeling errors, aging components, environmental conditions, or system wear. For example, variation in the internal resistance of the fuel cell due to temperature changes or aging, changes in the battery capacity over time due to degradation, fluctuations in converter inductance or capacitance values due to manufacturing tolerances or thermal effects and the like. The fractional-order sliding mode control strategy uses the estimated combined term when calculating the duty cycle values.

In an embodiment, fractional-order sliding mode control strategy uses utilize a fractional-order sliding mode surface defined by:

$$\zeta_i = e_i + \kappa_i \mathcal{D}^{\gamma-1}(\text{sgn}^\alpha(e_i))$$

where $e_i$ is a tracking error variable, $\kappa_i$ is a constant coefficient, $\gamma$ is a fractional order, $\alpha$ is a power exponent, sgn is the sign function, and i represents an index for the fuel cell, battery, ultracapacitor, and DC-bus voltage At step 910, the calculated duty cycle value is applied to the plurality of power converters that connect the fuel cell, the battery, and the ultracapacitor to the DC-bus, to maintain a current distribution despite the sensor fault.

The present disclosure provides a method or control strategy for Fuel Cell Hybrid Electric Vehicles (FCHEVs) by integrating a neural network-based finite-time fractional-order sliding mode controller (FO-SMC) with a minimal learning parameter scheme. The proposed method addresses two critical challenges in FCHEVs: parametric uncertainties and sensor faults, both of which can severely impair system performance. Unlike existing control techniques such as Backstepping Control (BC) and Double Integral Sliding Mode Control (DISMC), which offer asymptotic stability and limited fault resilience, the proposed controller ensures finite-time convergence, improved robustness, and high tracking accuracy under uncertain and faulty conditions. In the present disclosure, the neural network is preferable updated using the minimum learning parameter scheme to reduce the computational load and improve the convergence speed.

A key aspect of the disclosed method lies in the use of a RBFNN to estimate and compensate for unknown uncertainties and sensor faults in real time. To reduce computational burden, a minimal learning parameter scheme is employed, requiring the adaptation of only a single weight, which enhances real-time applicability and reduces complexity compared to conventional adaptive neural networks. The controller ensures that the fuel cell, acting as the primary energy source, and the battery and ultracapacitor, functioning as secondary sources, supply the desired currents to the DC load while maintaining DC-link voltage stability.

This is the first time that a fractional-order sliding mode control has been applied directly to the nonlinear model of the FCHEV, unlike earlier studies which used fractional-order extremum seeking control on simplified, linearized models. The nonlinear implementation ensures consistent and robust performance across varying operating conditions, even when the system deviates significantly from nominal parameters. Furthermore, this work pioneers the consideration of sensor faults—unlike prior literature which primarily focused on actuator faults—by integrating a fault estimation mechanism into the RBFNN, enabling the controller to maintain stability and tracking despite erroneous sensor feedback.

Simulation results demonstrate that the proposed control scheme significantly outperforms existing controllers in terms of response speed, accuracy, and fault tolerance. Even with ±40% parametric uncertainties and injected sensor faults, the system maintained stable operation with minimal tracking error. Comparative studies highlight the superior ability of the proposed method to reduce voltage deviation and improve convergence rate during acceleration and deceleration, affirming its robustness under practical driving conditions.

In conclusion, the proposed FO-SMC controller with neural network-based uncertainty and fault compensation introduces a substantial advancement in FCHEV control. It enhances system reliability, safety, and efficiency by ensuring robust current tracking and voltage regulation in the presence of both internal uncertainties and external fault.

Figure 10:
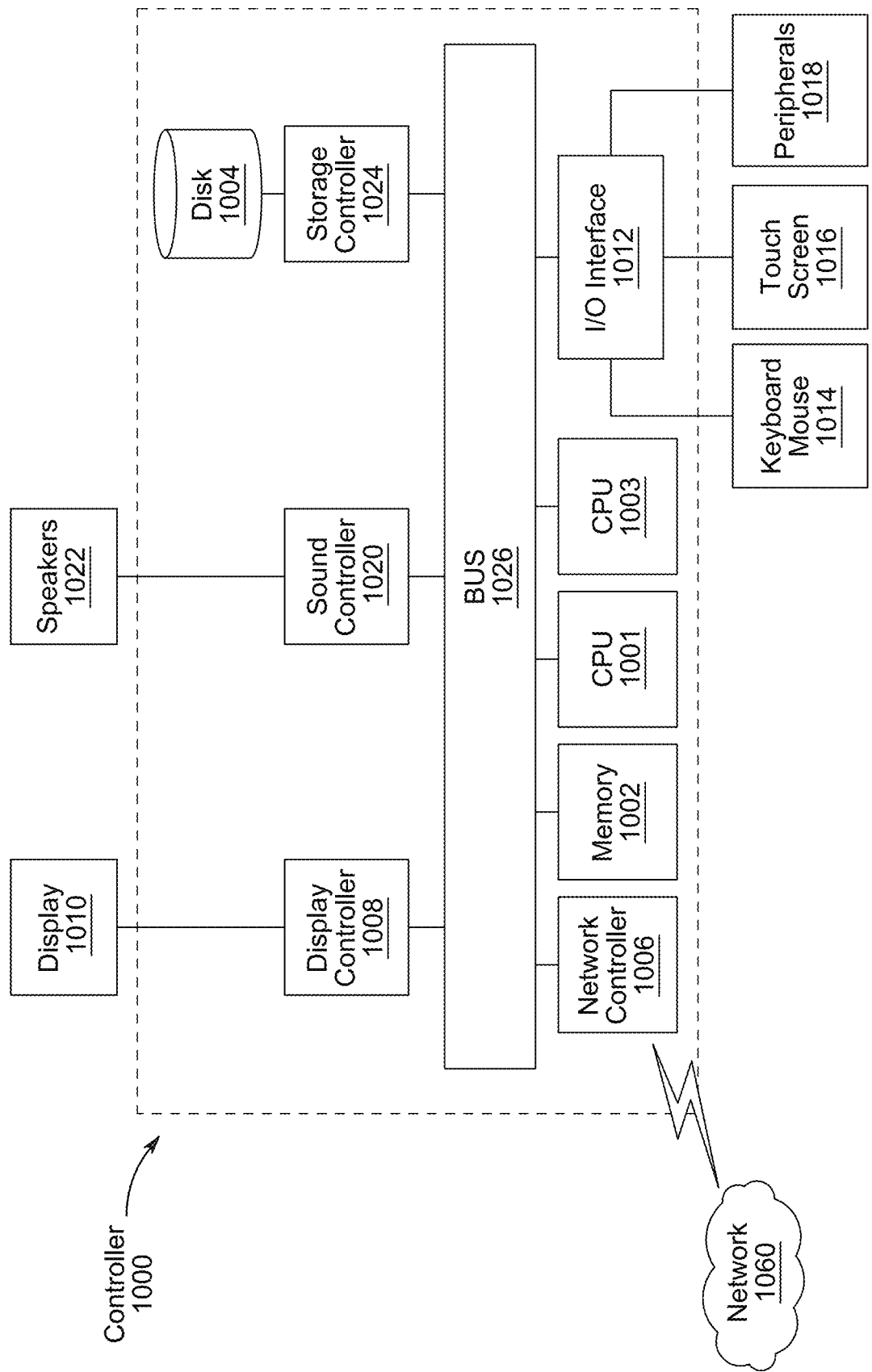
FIG. 10 illustrates a non-limiting example of details of computing hardware used in a computing system, according to certain embodiments.

Next, further details of the hardware description of the computing environment according to exemplary embodiments is described with reference to FIG. 10. In FIG. 10, a controller 1000 is described as representative of the system 100 of FIG. 1 in which the controller 1000 is a computing device which includes a CPU 1001 which performs the processes described above/below. The process data and instructions may be stored in a memory 1002. These processes and instructions may also be stored on a storage medium disk 1004 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 1001, a CPU 1003 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1001 or the CPU 1003 may be a Xenon or a Core processor from Intel of America or an Opteron processor from Advanced Micro Devices (AMD) of America, or may be other processor types that would be recognized by one of ordinary skill in the art. Alternatively, the CPU 1001, the CPU 1003 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1001, the CPU 1003 may be implemented as multiple processors cooperatively working in parallel to perform the instructions of the inventive processes described above.

The computing device in FIG. 10 also includes a network controller 1006, such as an Intel Ethernet Professional (PRO) network interface card from an Intel Corporation of America, for interfacing with a network 1060. As can be appreciated, the network 1060 can be a public network, such as the Internet, or a private network such as a LAN or a WAN, or any combination thereof and can also include a PSTN or an Integrated Services Digital Network (ISDN) sub-networks. The network 1060 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1008, such as a NVIDIA GeForce Giga Texel Shader eXtreme (GTX) or a Quadro graphics adaptor from a NVIDIA Corporation of America for interfacing with a display 1010, such as a Hewlett Packard HPL2445w Liquid Crystal Display (LCD) monitor. A general purpose I/O interface 1012 interfaces with a keyboard and/or mouse 1014 as well as a touch screen panel 1016 on or separate from display 1010. The general purpose I/O interface 1012 also connects to a variety of peripherals 1018 including printers and scanners, such as an OfficeJet or DeskJet from HP.

A sound controller 1020 is also provided in the computing device such as a Sound Blaster X-Fi Titanium from Creative, to interface with speakers/microphone 1022 thereby providing sounds and/or music.

A general purpose storage controller 1024 connects the storage medium disk 1004 with a communication bus 1026, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1010, keyboard and/or mouse 1014, as well as the display controller 1008, the general purpose storage controller 1024, the network controller 1006, the sound controller 1020, and the general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
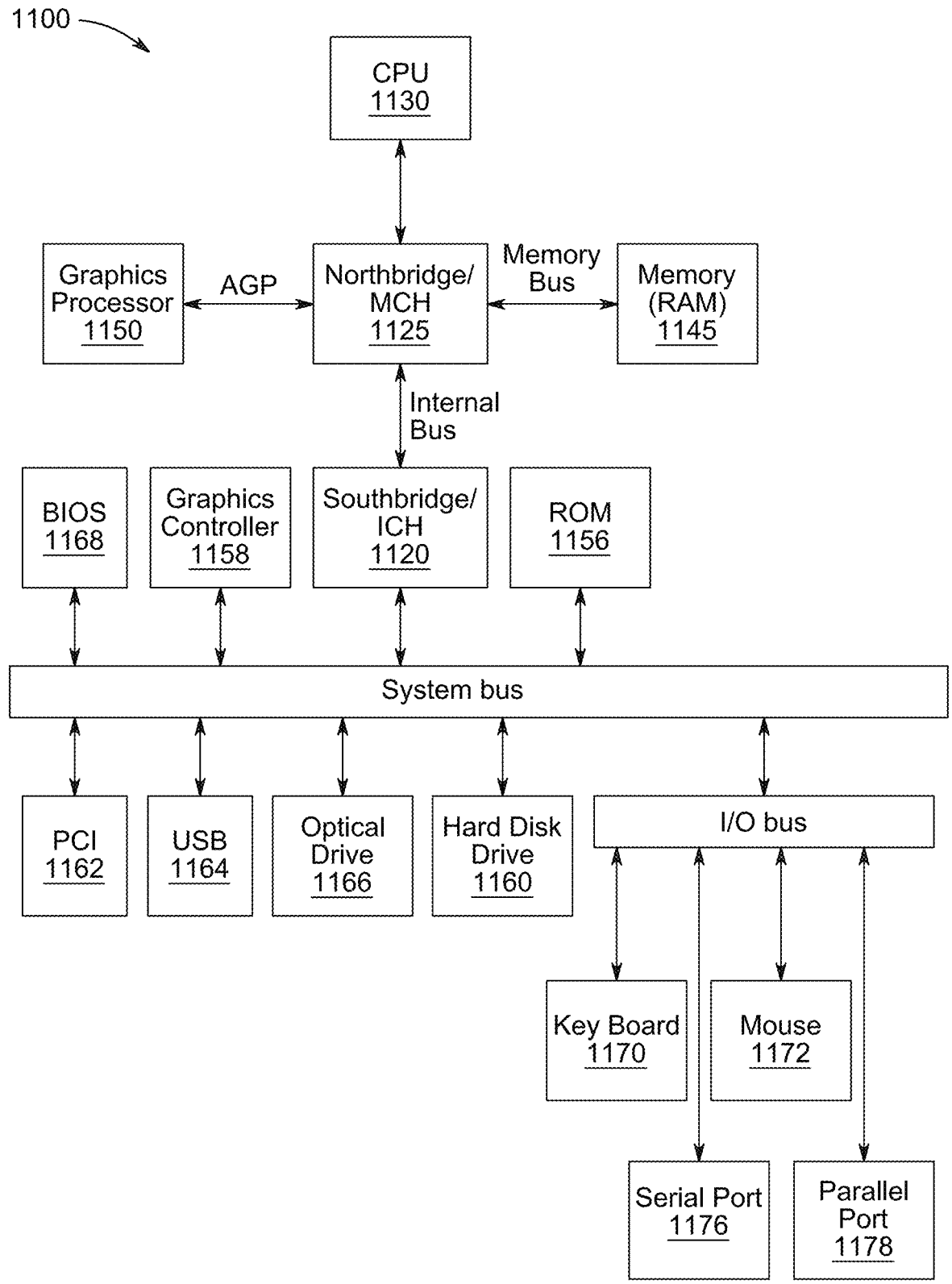
FIG. 11 is an exemplary schematic diagram of a data processing system used within the computing system, according to certain embodiments.

FIG. 11 shows a schematic diagram of a data processing system 1100, according to certain embodiments, for performing the functions of the exemplary embodiments. The data processing system 1100 is an example of a computer in which code or instructions implementing the processes of the illustrative embodiments may be located.

In FIG. 11, the data processing system 1100 employs a hub architecture including a North Bridge and a Memory Controller Hub (NB/MCH) 1125 and a south bridge and an I/O Controller Hub (SB/ICH) 1120. The CPU 1130 is connected to the NB/MCH 1125. The NB/MCH 1125 also connects to a memory 1145 via a memory bus and connects to a graphics processor 1150 via an Accelerated Graphics Port (AGP). The NB/MCH 1125 also connects to the SB/ICH 1120 via an internal bus (e.g., a unified media interface or a direct media interface). The CPU 1130 may contain one or more processors and even may be implemented using one or more heterogeneous processor systems.

Figure 12:
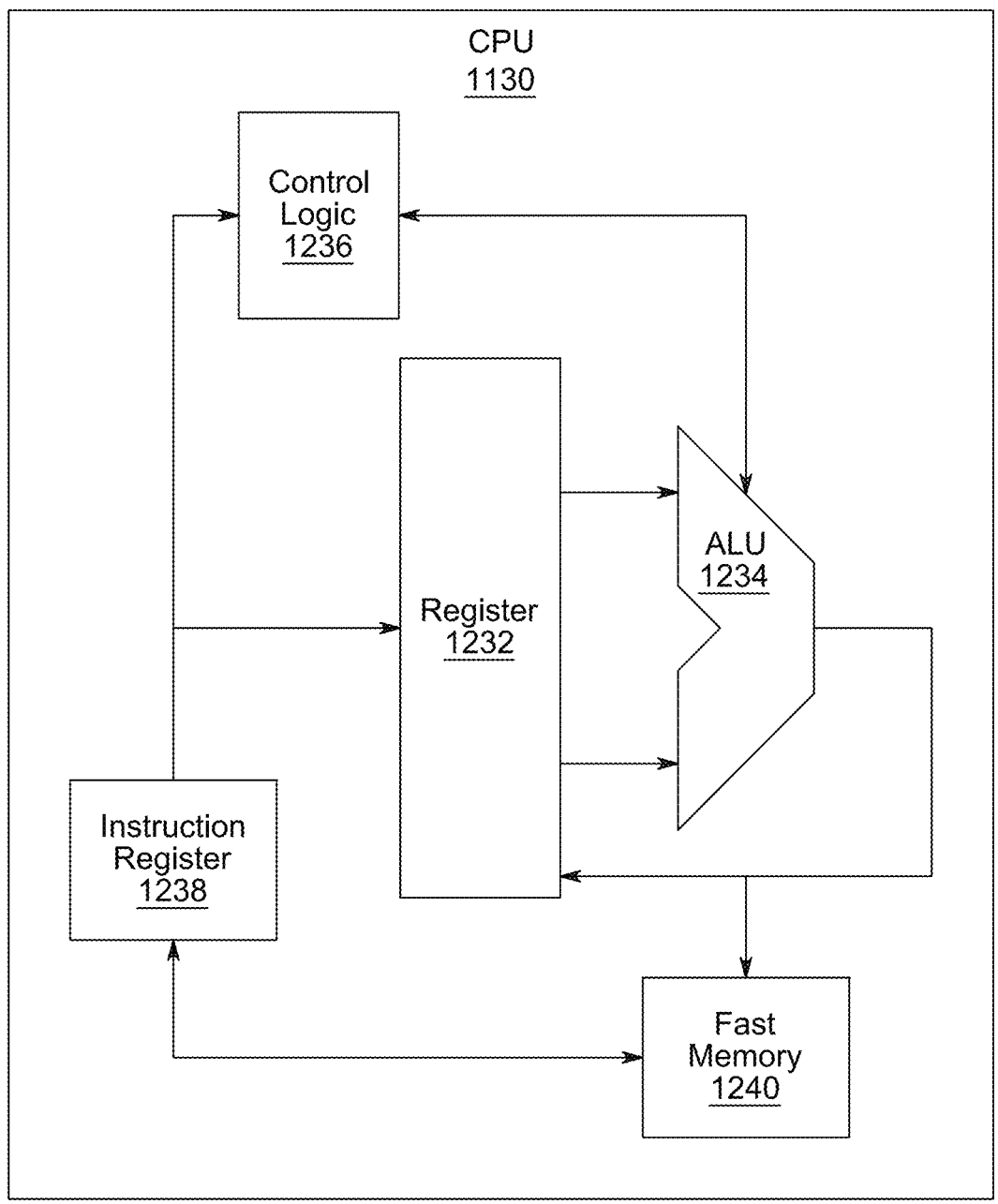
FIG. 12 is an exemplary schematic diagram of a processor used with the computing system, according to certain embodiments.

For example, FIG. 12 shows one implementation of the CPU 1130. In one implementation, an instruction register 1238 retrieves instructions from a fast memory 1240. At least part of these instructions is fetched from the instruction register 1238 by a control logic 1236 and interpreted according to the instruction set architecture of the CPU 1130. Part of the instructions can also be directed to a register 1232. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1234 that loads values from the register 1232 and performs logical and mathematical operations on the loaded values according to the instructions. The results from these operations can be feedback into the register 1232 and/or stored in the fast memory 1240. According to certain implementations, the instruction set architecture of the CPU 1130 can use a reduced instruction set architecture, a complex instruction set architecture, a vector processor architecture, and a very large instruction word architecture. Furthermore, the CPU 1130 can be based on a Von Neuman model or a Harvard model. The CPU 1130 can be a digital signal processor, an FPGA, an ASIC, a Programmable Logic Array (PLA), a PLD, or a Complex Programmable Logic Device (CPLD). Further, the CPU 1130 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 11, the data processing system 1100 can include that the SB/ICH 1120 is coupled through a system bus to an I/O Bus, a ROM 1156, a Universal Serial Bus (USB) port 1164, a flash Binary Input/Output System (BIOS) 1168, and a graphics controller 1158. PCI/PCIe devices can also be coupled to SB/ICH 888 through a PCI bus 1162.

The PCI devices may include, for example, Ethernet adapters, add-in cards, and Personal Computer (PC) cards for notebook computers. The HDD 1160 and an optical drive 1166 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1160 and the optical drive 1166 can also be coupled to the SB/ICH 1120 through a system bus. In one implementation, a keyboard 1170, a mouse 1172, a serial port 1176, and a parallel port 1178 can be connected to the system bus through the I/O bus. Other peripherals and devices that can be connected to the SB/ICH 1120 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 13:
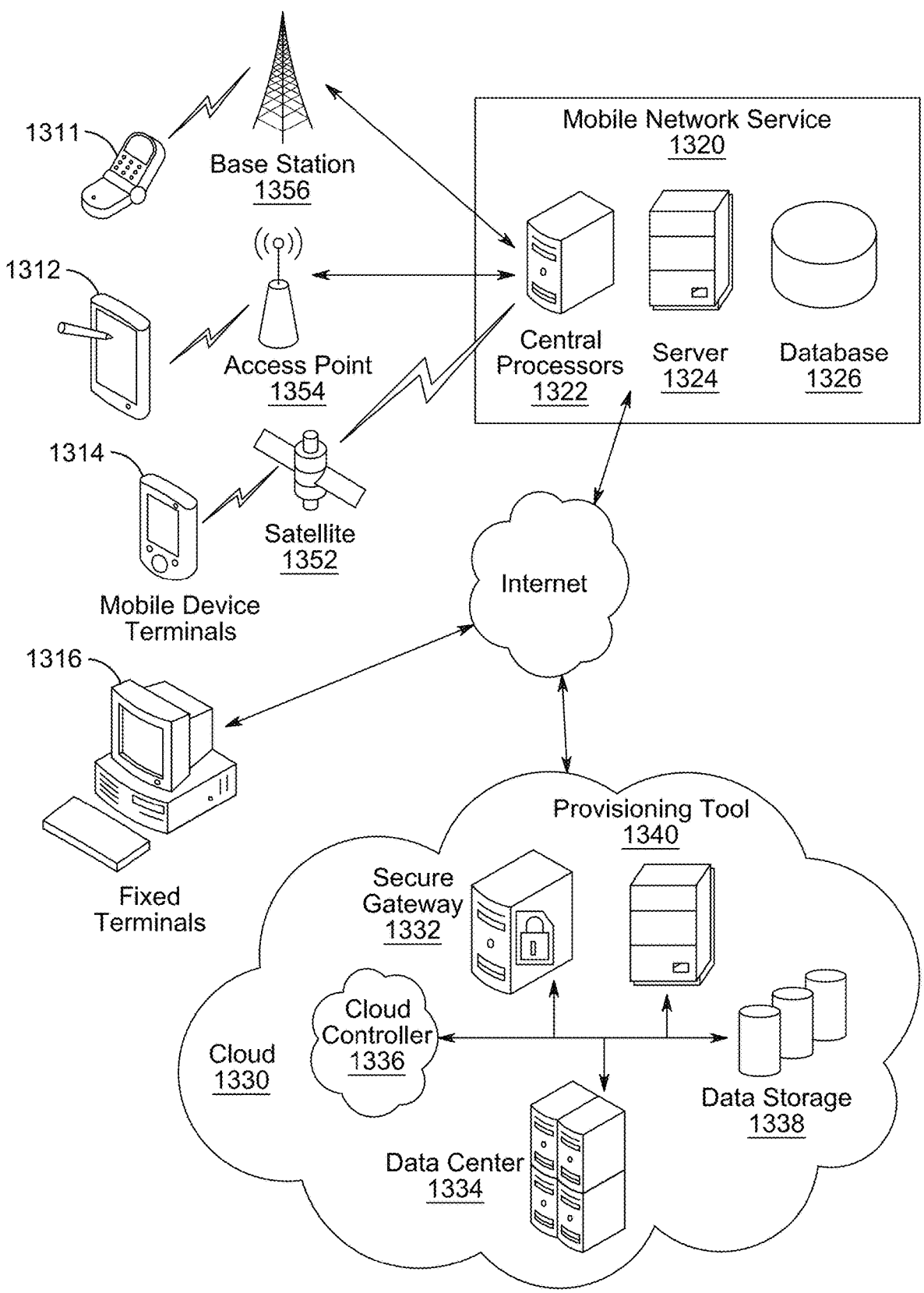
FIG. 13 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). More specifically, FIG. 13 illustrates client devices including a smart phone 1311, a tablet 1312, a mobile device terminal 1314 and fixed terminals 1316. These client devices may be commutatively coupled with a mobile network service 1320 via a base station 1356, an access point 1354, a satellite 1352 or via an internet connection. The mobile network service 1320 may comprise central processors 1322, a server 1324 and a database 1326. The fixed terminals 1316 and the mobile network service 1320 may be commutatively coupled via an internet connection to functions in cloud 1330 that may comprise a security gateway 1332, a data center 1334, a cloud controller 1336, a data storage 1338 and a provisioning tool 1340. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is, therefore, to be understood that the invention may be practiced otherwise than as specifically described herein.

The invention claimed is:

1. A fault-tolerant control system for a fuel cell hybrid electric vehicle (FCHEV), comprising:
   a fuel cell, a battery, and an ultracapacitor connected to a direct current-bus (DC-bus) via a plurality of power converters;
   a plurality of sensors configured to measure a current of the fuel cell, a current of the battery, and a current of the ultracapacitor, and a voltage of the DC-bus;
   a controller operatively connected to the plurality of sensors and the plurality of power converters, wherein the controller is configured to:
   calculate a duty cycle value for each power converter in the plurality of power converters using a fractional-order sliding mode control strategy with finite-time stability;
   use a radial basis function neural network (RBFNN) to estimate and compensate for a sensor fault occurring in at least one of the measured currents; and
   utilize a minimum learning parameter scheme configured to adjust the RBFNN through adaptation of a single parameter $\varrho_i = \Xi_i^T \Xi_i$, (i=1, 2, 3, 4), where $\Xi_i^T$ is a transpose of a weight vector, $\Xi_i$ is a weight vector, instead of a plurality of neural network weights; and
   regulate a current distribution from the fuel cell, the battery, and the ultracapacitor to the DC-bus while maintaining the DC-bus voltage at a reference value despite the sensor fault.

2. The system of claim 1, wherein the controller is further configured to regulate the current distribution from the fuel cell, the battery, and the ultracapacitor to the DC-bus according to an energy management strategy, wherein the energy management strategy calculates a current value for the fuel cell, a current value for the battery and a current value for the ultracapacitor based on a load demand from a traction motor and a vehicle operating conditions.

3. The system of claim 1, wherein the controller is configured to detect and estimate a plurality of sensor fault types including a bias, a drift, a loss of accuracy, and a loss of effectiveness.

4. The system of claim 1, wherein the fractional-order sliding mode control algorithm utilizes a fractional calculus according to a Caputo definition $$_a\mathcal{D}_t^\gamma = \begin{cases} \frac{1}{\Gamma(n-\gamma)} \int_a^t \frac{f(\tau)}{(t-\tau)^{\gamma-n+1}}, & n-1 < \gamma < n \\ \frac{d^n}{dt^n} f(\tau)\gamma = n \end{cases} \quad (\#)$$

where $\mathcal{D}_t^y$ represents a fractional derivative of order y with respect to t, f(t) is a continuous function, a and t are limit values of integration, y is the fractional order with y>0, n is the smallest integer greater than y (thus n>0), and $\Gamma(\cdot)$ is a gamma function.

5. The system of claim 1, wherein the controller is configured to establish finite-time stability of the system using a Lyapunov function.

6. The system of claim 1, wherein the controller is further configured to estimate a parametric uncertainty in the FCHEV system using the RBFNN and adjust the calculated duty cycle value based on the estimated parametric uncertainty.

7. The system of claim 1, wherein the controller is configured to utilize a fractional-order sliding mode surface defined by:

$$\zeta_i = e_i + \kappa_i \mathcal{D}^{\gamma-1}(\text{sgn}^\alpha(e_i))$$

where $e_i$ is a tracking error variable, $\kappa_i$ is a constant coefficient, $\gamma$ is a fractional order, $\alpha$ is a power exponent, sgn is the sign function, and i represents an index for the fuel cell, battery, ultracapacitor, and DC-bus voltage.

8. A method for controlling a fuel cell hybrid electric vehicle (FCHEV) with sensor fault tolerance, comprising:
   receiving a current measurement of a fuel cell, a current measurement of a battery, and a current measurement of an ultracapacitor, and a voltage measurement of a direct current-bus (DC-bus) from a plurality of sensors;
   detecting and estimating a sensor fault in at least one of the plurality of current measurements using a radial basis function neural network (RBFNN);
   calculating a new value for a single parameter of the RBFNN according to a minimum learning parameter scheme instead of a plurality of individual neural network weights, thereby reducing computational burden;
   calculating a duty cycle value for each power converter in the plurality of power converters using a fractional-order sliding mode control strategy with finite-time stability to compensate for the estimated sensor fault; and
   applying the calculated duty cycle value to a plurality of power converters that connect the fuel cell, the battery, and the ultracapacitor to the DC-bus, to maintain a current distribution despite the sensor fault.

9. The method of claim 8, wherein a load current demand is distributed between the fuel cell, the battery, and the ultracapacitor according to an energy management strategy.

10. The method of claim 9, wherein the energy management strategy includes:
    restricting the fuel cell current below a current threshold level to prevent fuel cell degradation;
    maintaining the battery current between a lower current threshold level and an upper current threshold level; and
    calculating the ultracapacitor current as a difference between the load current and a sum of the fuel cell current and the battery current, wherein the ultracapacitor receives charging current during vehicle deceleration when the battery current reaches the lower current threshold level.

11. The method of claim 8, wherein the fractional-order sliding mode control strategy uses a fractional-order sliding mode surface and a fault-tolerant control law, wherein the fault-tolerant control law is based on a Lyapunov stability analysis.

12. The method of claim 8, wherein the fractional-order sliding mode control strategy provides a finite-time convergence of a tracking error for the current of the fuel cell, the current of the battery, the current of the ultracapacitor, and the voltage of the DC-bus.

13. The method of claim 8, wherein:
the RBFNN estimates a combined term comprising the sensor fault and a parametric uncertainty as a combined term; and
the fractional-order sliding mode control strategy uses the estimated combined term when calculating the duty cycle values.

14. The method of claim 8, wherein detecting and estimating the sensor fault comprises identifying at least one fault type selected from a group consisting of:
a bias fault;
a drift fault;
a loss of accuracy fault; and
a loss of effectiveness fault.

15. A non-transitory computer-readable medium storing instructions that, when executed by a processor, cause the processor to perform the method of claim 8.

16. The non-transitory computer-readable medium of claim 15, wherein the minimum learning parameter scheme calculates the single parameter according to a formula:

$$\dot{\bar{e}}_i = c_i((\zeta_i^2 \phi_i^\tau \varphi_i)/2 - \eta_i \bar{e}_i)$$

where $c_i$ is a learning rate, $\eta_i$ is a positive constant, $\tau_i$ is a fractional-order sliding mode surface, $\phi_i$ is a Gaussian function vector, and $\bar{e}_i$ is the estimated parameter.

* * * * *